US012726896B2

(12) United States Patent
Choi et al.

(10) Patent No.: US 12,726,896 B2
(45) Date of Patent: Sep. 1, 2026

(54) MULTI-LINK POWER MANAGEMENT FOR MULTI-LINK DEVICE

(71) Applicant: SAMSUNG ELECTRONICS CO., LTD., Suwon-si (KR)

(72) Inventors: Junsu Choi, Suwon-si (KR); Junhak Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 350 days.

(21) Appl. No.: 18/353,814

(22) Filed: Jul. 17, 2023

(65) Prior Publication Data

US 2024/0049129 A1 Feb. 8, 2024

Related U.S. Application Data

(63) Continuation of application No. PCT/KR2023/007771, filed on Jun. 7, 2023.

(Continued)

(30) Foreign Application Priority Data

Nov. 9, 2022 (KR) ........................ 10-2022-0148955

(51) Int. Cl.
*H04W 52/02* (2009.01)
*H04W 28/02* (2009.01)
(Continued)

(52) U.S. Cl.
CPC ... *H04W 52/0206* (2013.01); *H04W 28/0263* (2013.01); *H04W 28/0827* (2020.05);
(Continued)

(58) Field of Classification Search
None
See application file for complete search history.

(56) References Cited

U.S. PATENT DOCUMENTS 11,304,133 B2 4/2022 Kneckt et al.
2021/0007168 A1 1/2021 Asterjadhi et al.
(Continued)

FOREIGN PATENT DOCUMENTS

EP 3764702 A1 7/2020
WO 2021/162234 A1 8/2021
(Continued)

OTHER PUBLICATIONS

International Search Report for PCT/KR2023/007771 by Korean Intellectual Property Office dated Sep. 12, 2023.
(Continued)

*Primary Examiner* — Jutai Kao
(74) *Attorney, Agent, or Firm* — NIXON & VANDERHYE P.C.

(57) ABSTRACT

A wireless communication network includes an access point (AP) multi-link device (MLD) and a non-AP MLD. The AP MLD transmits to a first station affiliated with the non-AP MLD via a first link an indication of pending traffic on a second link. A second station affiliated with the non-AP MLD transmits via the second link a trigger frame to retrieve pending traffic. The AP MLD transmits the pending traffic to the second station affiliated with the non-AP MLD via the second link in response to receiving the trigger frame. In addition, various embodiments that are understood through the present disclosure may be implemented.

17 Claims, 20 Drawing Sheets

Related U.S. Application Data

(60) Provisional application No. 63/376,222, filed on Sep. 19, 2022, provisional application No. 63/370,201, filed on Aug. 2, 2022.

(51) Int. Cl.

| | |
|---|---|
| ***H04W 28/08*** | (2023.01) |
| ***H04W 72/1263*** | (2023.01) |
| ***H04W 76/15*** | (2018.01) |
| ***H04W 76/20*** | (2018.01) |

(52) U.S. Cl.

CPC ... *H04W 52/0216* (2013.01); *H04W 52/0235* (2013.01); *H04W 72/1263* (2013.01); *H04W 76/15* (2018.02); *H04W 76/20* (2018.02)

(56) References Cited

U.S. PATENT DOCUMENTS

| | | | | |
|---|---|---|---|---|
| 2021/0051513 | A1* | 2/2021 | Min | H04W 88/10 |
| 2021/0289442 | A1 | 9/2021 | Naribole et al. | |
| 2022/0174536 | A1 | 6/2022 | Kwon et al. | |
| 2022/0182184 | A1 | 6/2022 | Wang et al. | |
| 2023/0107072 | A1* | 4/2023 | Kim | H04W 28/02 370/230 |
| 2023/0262807 | A1* | 8/2023 | Jiang | H04W 76/15 370/329 |
| 2023/0308938 | A1* | 9/2023 | Sun | H04W 28/0278 |
| 2024/0114573 | A1* | 4/2024 | Ko | H04W 76/15 |
| 2025/0287444 | A1* | 9/2025 | Kucharewski | H04W 76/10 |

FOREIGN PATENT DOCUMENTS

| | | | |
|---|---|---|---|
| WO | 2021/172961 | A1 | 9/2021 |
| WO | 2022/015045 | A1 | 1/2022 |

OTHER PUBLICATIONS

Ratnam, Vishnu V., ‘ML traffic indication using A-control’, IEEE 802.11-22/1201r0, Jul. 26, 2022.

Park, Minyoung, ‘CC34 comment resolution for 35.3.10.4 traffic indication’, IEEE 802.11-21/0612r0, Apr. 23, 2021.

* cited by examiner

Layer 3

228

MAC SAP

220

Non-AP MLD

STA1

STA2

STA3

2.4GHz Link 1

5 GHz Link 2

6 GHz Link 3

AP1

AP2

AP3

210

AP MLD

218

MAC SAP

Layer 3

500
Element ID
Length
Element ID Extension
TID-To-Link Mapping Control
Link Mapping Of TID 0 (Optional)
Link Mapping Of TID 7 (Optional)
Octets:
1
1
1
1 or 2
0 or 2
0 or 2
B0
B1
B2
B3
B7
B8
B15
Direction
Default Link Mapping
Reserved
Link Mapping Presence Indicator (Optional)
Bits:
2
1
5
0 or 8

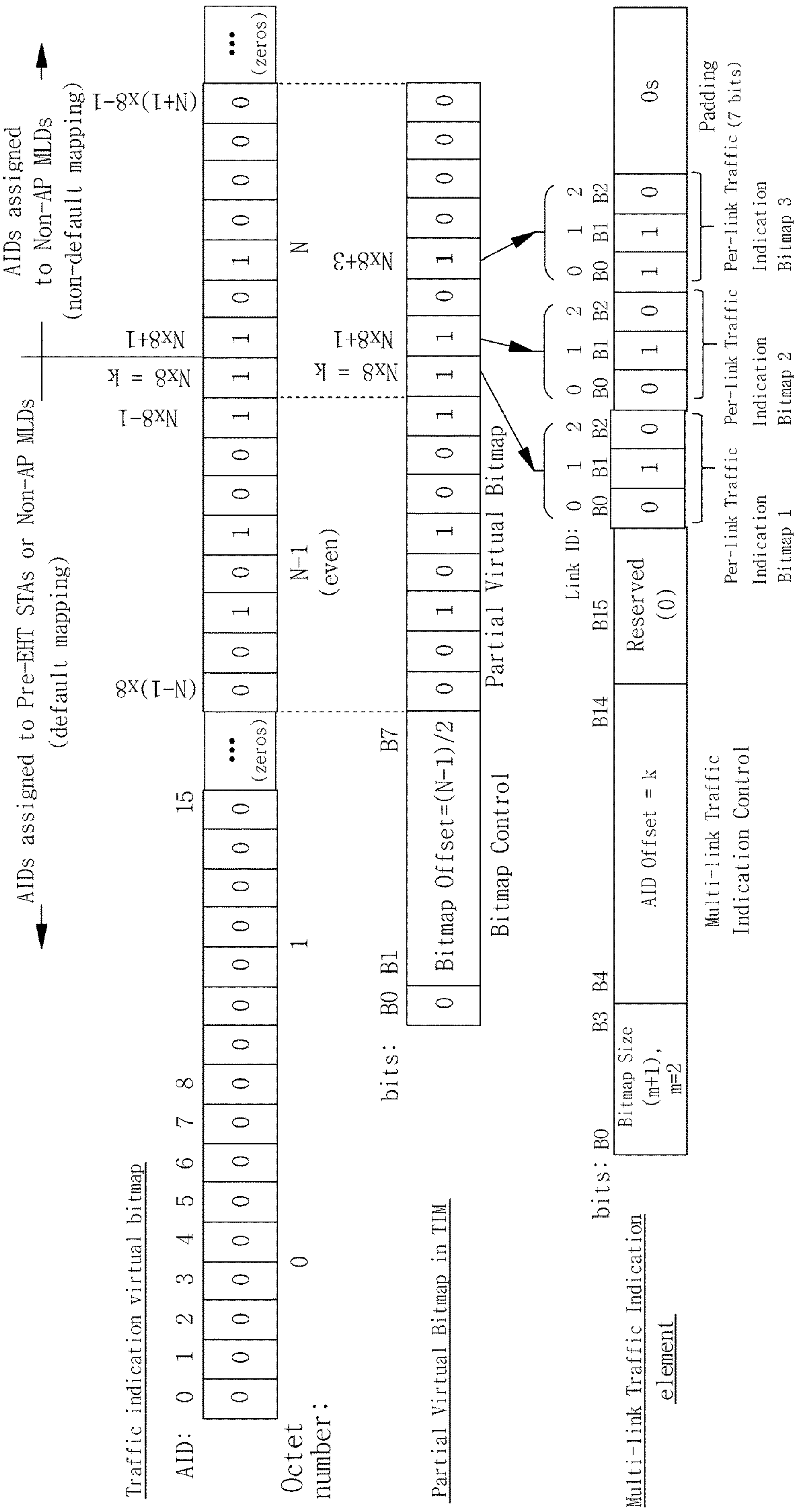

FIG. 7
AIDs assigned to Pre-EHT STAs or Non-AP MLDs (default mapping)
AIDs assigned to Non-AP MLDs (non-default mapping)
Traffic indication virtual bitmap
AID: 0 1 2 3 4 5 6 7 8
15
(N-1)x8
Nx8-1
Nx8 = k
Nx8+1
(N+1)x8-1
(zeros)
Octet number:
0
1
N-1 (even)
N
Partial Virtual Bitmap in TIM
bits: B0 B1 B7
Bitmap Offset=(N-1)/2
Bitmap Control
Partial Virtual Bitmap
Nx8+3
Multi-link Traffic Indication element
bits: B0 B3 B4 B14 B15
Bitmap Size (m+1), m=2
AID Offset = k
Reserved (0)
Multi-link Traffic Indication Control
Link ID: 0 1 2
B0 B1 B2
Per-link Traffic Indication Bitmap 1
Per-link Traffic Indication Bitmap 2
Per-link Traffic Indication Bitmap 3
0s
Padding (7 bits)

Large amount of buffer traffic or high data rate
220
Non-AP MLD
STA1
STA2
STA3
Buffered Traffic
Buffered Traffic
Buffered Traffic
600
Multi-Link Traffic Indication
1103
Link1
Link2
Link3
AP1
AP2
AP3
210
AP MLD 220
Non-AP MLD
222
224
226
STA1
STA2
STA3
MLD traffic information
1701
TIM
401
Doze state
Buffered Traffic
Buffered Traffic
Link1
Link2
Link3
AP1
AP2
AP3
210
AP MLD
212
214
216

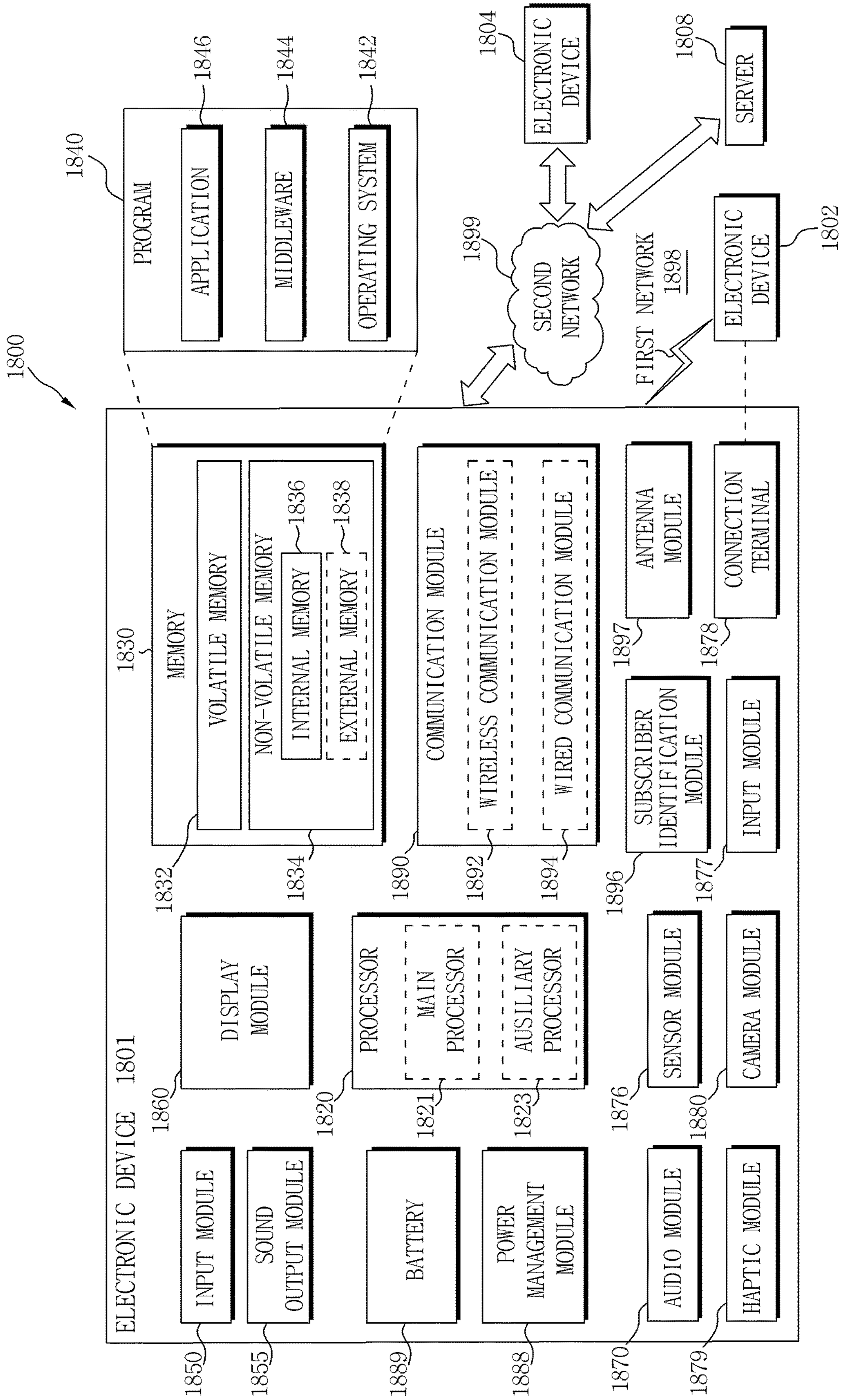

FIG. 18
1800
ELECTRONIC DEVICE 1801
INPUT MODULE
1850
SOUND OUTPUT MODULE
1855
DISPLAY MODULE
1860
BATTERY
1889
PROCESSOR
1820
MAIN PROCESSOR
1821
AUXILIARY PROCESSOR
1823
POWER MANAGEMENT MODULE
1888
AUDIO MODULE
1870
SENSOR MODULE
1876
HAPTIC MODULE
1879
CAMERA MODULE
1880
MEMORY
1830
VOLATILE MEMORY
1832
NON-VOLATILE MEMORY
1834
INTERNAL MEMORY
1836
EXTERNAL MEMORY
1838
COMMUNICATION MODULE
1890
WIRELESS COMMUNICATION MODULE
1892
WIRED COMMUNICATION MODULE
1894
SUBSCRIBER IDENTIFICATION MODULE
1896
INPUT MODULE
1877
ANTENNA MODULE
1897
CONNECTION TERMINAL
1878
PROGRAM
1840
APPLICATION
1846
MIDDLEWARE
1844
OPERATING SYSTEM
1842
SECOND NETWORK
1899
FIRST NETWORK 1898
ELECTRONIC DEVICE
1802
ELECTRONIC DEVICE
1804
SERVER
1808

MULTI-LINK POWER MANAGEMENT FOR MULTI-LINK DEVICE

CROSS-REFERENCE FOR RELATED APPLICATIONS

This application is a Continuation Application of PCT International Application No. PCT/KR2023/007771 filed on Jun. 7, 2023, which claims benefit of U.S. Provisional Application No. 63/376,222 filed on Sep. 19, 2022, and U.S. Provisional Application No. 63/370,201 filed on Aug. 2, 2022, and claims priority to Korean Patent Application No. 10-2022-0148955 filed on Nov. 9, 2022, the entire contents of which are hereby incorporated by references in its entirety.

TECHNICAL FIELD

The disclosure relates to wireless communication, and to, for example, but not limited to, multi-link power management for a multi-link device for wireless communication.

BACKGROUND

Wireless local area network (WLAN) technology has evolved toward increasing data rates and continues its growth in various market such as home, enterprise and hotspots over the years since the late 1990s. WLAN devices are increasingly required to support a variety of delay-sensitive applications or real-time applications such as augmented reality (AR), robotics, artificial intelligence (AI), cloud computing, or unmanned vehicles. To implement extremely low latency and/or high throughput required by such applications, multi-link operation (MLO) has been suggested in the WLAN. The WLAN may be formed within a limited area such as a home, school, apartment, or office building by WLAN devices. Each WLAN device may have one or more stations (STAs) such as the access point (AP) STA or the non-access-point (non-AP) STA.

The MLO may enable a non-AP multi-link device (MLD) to set up multiple links with an AP MLD. Each of multiple links may enable channel access and/or frame exchanges between the non-AP MLD and the AP MLD independently, which may reduce latency and increase throughput.

The description set forth in the background section should not be assumed to be prior art merely because it is set forth in the background section. The background section may describe aspects or embodiments of the present disclosure.

SUMMARY

One aspect of the present disclosure provides an access point (AP) multi-link device (MLD). The AP MLD comprises one or more memories and one or more processors operatively coupled to the one or more memories. The one or more processors are configured to cause transmitting, to a first station affiliated with a non-AP MLD via a first link, an indication indicating presence of pending traffic on a second link. The one or more processors are configured to cause receiving, from a second station affiliated with the non-AP MLD via the second link, a trigger frame to retrieve buffered traffic from the AP MLD. The one or more processors are configured to cause transmitting, to the second station affiliated with the non-AP MLD via the second link, buffered traffic in response to receiving the trigger frame.

Another aspect of the present disclosure provides a non-AP MLD. The non-AP MLD comprises one or more memories and one or more processors operatively coupled to the one or more memories. The one or more processors are configured to cause receiving, from a first AP affiliated with an AP MLD via a first link, an indication indicating presence of pending traffic on a second link. The one or more processors are configured to cause transmitting, to a second AP affiliated with the AP MLD via the second link, a trigger frame to retrieve buffered traffic from the AP MLD. The one or more processors are configured to cause receiving, from the second AP affiliated with the AP MLD via the second link, buffered traffic from the AP MLD.

Another aspect of the present disclosure provides a non-AP MLD. The non-AP MLD comprises one or more memories and one or more processors operatively coupled to the one or more memories. The one or more processors are configured to cause receiving, from a first AP affiliated with an AP MLD via a first link, an indication of traffic status of the AP MLD. The one or more processors are configured to cause determining a second link as a link to retrieve buffered traffic from the AP MLD. The one or more processors are configured to cause transmitting, to a second AP affiliated with the AP MLD via the second link, a trigger frame to retrieve buffered traffic from the AP MLD. The one or more processors are configured to cause receiving, from the second AP affiliated with the AP MLD via the second link, buffered traffic from the AP MLD.

BRIEF DESCRIPTION OF THE DRAWINGS

FIG. 7 shows an example of construction of the Multi-Link Traffic Indication element in accordance with an embodiment.

FIG. 18 shows an example of an electronic device in a network environment in accordance with an embodiment.

DETAILED DESCRIPTION

Figure 1:
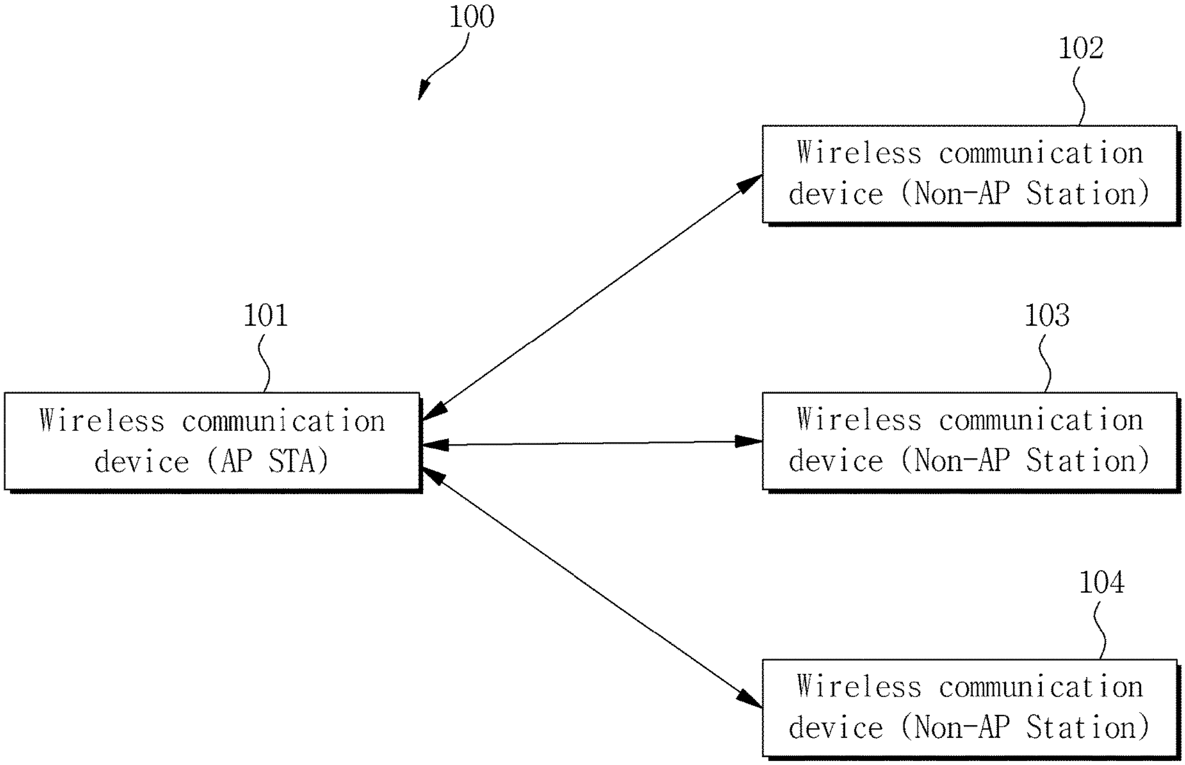
FIG. 1 shows an example of wireless communication network in accordance with an embodiment.

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The following description is directed to certain implementations for the purposes of describing the innovative aspects of this disclosure. However, a person having ordinary skill in the art will readily recognize that the teachings herein can be applied in a multitude of different ways. The examples in this disclosure are based on WLAN communication according to the Institute of Electrical and Electronics Engineers (IEEE) 802.11 standard, including IEEE 802.11be standard and any future amendments to the IEEE 802.11 standard. However, the described embodiments may be implemented in any device, system or network that is capable of transmitting and receiving radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

FIG. 1 shows an example of wireless communication network in accordance with an embodiment. As shown in FIG. 1, the wireless communication network 100 may include a plurality of wireless communication devices 101-104. Each wireless communication device 101-104 may include one or more STAs. The STA may be a logical entity that is a singly addressable instance of a medium access control (MAC) layer and a physical (PHY) layer interface to the wireless medium (WM). The STA may be classified into an access point (AP) STA and a non-AP STA. The AP STA may be an entity that contains one STA and provides access to the distribution system service via the wireless medium for associated STAs. The non-AP STA may be a STA that is not contained within an AP-STA. In the example of FIG. 1, the wireless communication device 101 may include one or more AP STAs and each of wireless communication devices 102-104 may include one or more non-AP STAs. In an embodiment, the wireless communication device 101 may include a non-AP STA instead of the AP STA. For simplicity of description, an AP STA may be referred to as an AP and a non-AP STA may be referred to as a STA.

An AP STA may comprise, be implemented as, or be included in a wireless communication device such as a centralized controller, a base station (BS), a node-B, a base transceiver system (BTS), a site controller, a network adapter, and a router. A non-AP STA may comprise, be implemented as, or be included in a wireless communication device such as a terminal, a wireless transmit/receive unit (WTRU), a user equipment (UE), a mobile station (MS), a mobile terminal, a mobile subscriber unit, a laptop, a smartphone, a battery pack, or a non-mobile computing device.

Figure 2:
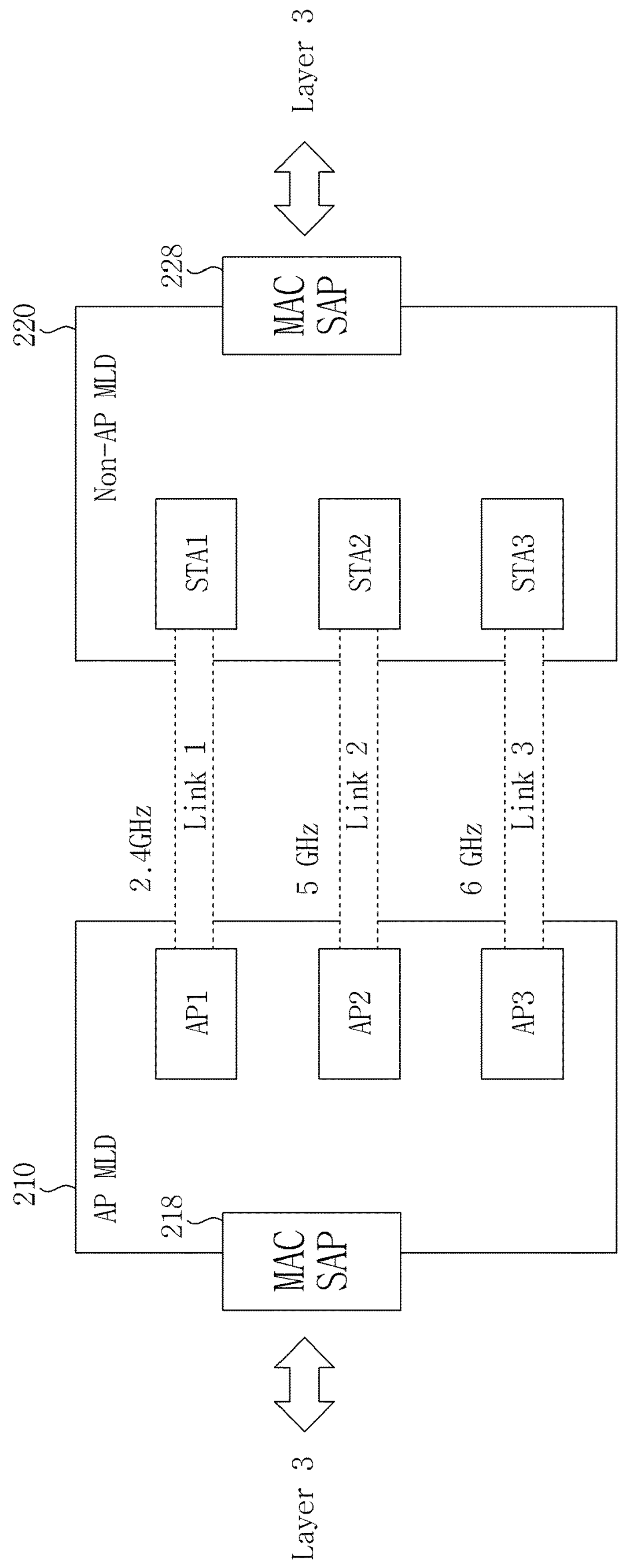
FIG. 2 shows an example of multi-link communication operation in accordance with an embodiment.

FIG. 2 shows an example of multi-link communication operation in accordance with an embodiment. The multi-link communication operation may be usable in IEEE 802.11be standard and/or any future amendments to IEEE 802.11 standard. In FIG. 2, an AP MLD 210 may be the wireless communication device 101 in FIG. 1 and a non-AP MLD 220 may be one of the wireless communication devices 102-104 in FIG. 1.

As shown in FIG. 2, the AP MLD 210 may include a plurality of affiliated APs, for example, including AP 1, AP 2 and AP 3. Each affiliated AP includes a PHY interface to the wireless medium (Link 1, Link 2, and Link 3). The AP MLD 210 may include a single MAC SAP (service access point) 218 through which the affiliated APs of the AP MLD 210 communicate with a higher layer (Layer 3 or network layer).

Each affiliated AP of the AP MLD 210 may have a MAC address (lower MAC address) different from any other affiliated APs of the AP MLD 210. The AP MLD 210 may have a MLD MAC address (upper MAC address) and the affiliated APs may share the single MAC SAP 218 to Layer 3. Thus, the affiliated APs share a single IP address, and the Layer 3 recognizes the AP MLD 210 by assigning the single IP address.

The non-AP MLD 220 may include a plurality of affiliated STAs, for example, including STA 1, STA 2 and STA 3. Each affiliated STA includes a PHY interface to the wireless medium (Link 1, Link 2, and Link 3). The non-AP MLD 220 includes a single MAC SAP 228 through which the affiliated STAs of the non-AP MLD 220 communicate with a higher layer (Layer 3 or network layer). Each affiliated STA of the non-AP MLD 220 may have a MAC address (lower MAC address) different from any other affiliated STAs of the non-AP MLD 220. The non-AP MLD 220 may have a MLD MAC address (upper MAC address) and the affiliated APs share the single MAC SAP 228 to Layer 3. Thus, the affiliated APs share a single IP address, and the Layer 3 recognizes the non-AP MLD 220 by assigning the single IP address.

The AP MLD 210 and the non-AP MLD 220 may set up multiple links between its affiliate APs and STAs. In this example, the AP 1 and the STA 1 may set up Link 1 which operates in 2.4 GHz band, the AP 2 and the STA 2 may set up Link 2 which operates in 5 GHz band, and the AP 3 and the STA 3 may set up Link 3 which operates in 6 GHz band. Each link may enable channel access and frame exchange between the AP MLD 210 and the non-AP MLD 220 independently, which may increase date throughput and reduce latency.

Figure 3:
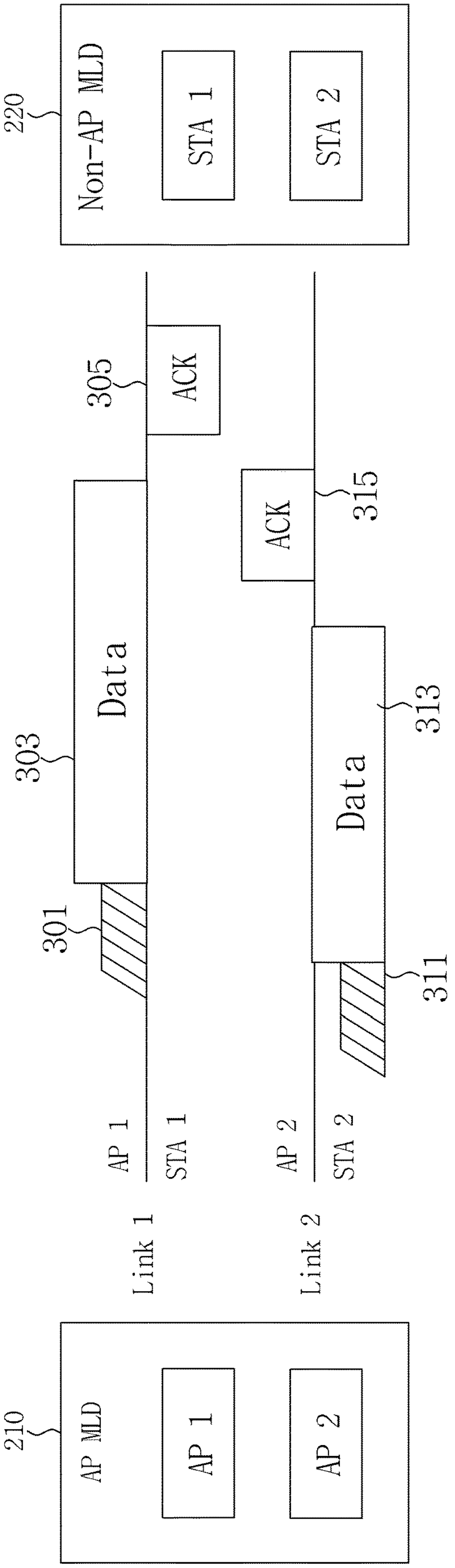
FIG. 3 shows an example of data transmission in multi-link operation in accordance with an embodiment.

FIG. 3 shows an example of data transmission in multi-link operation in accordance with an embodiment. For simplicity of description, part of the AP MLD 210 and part of the non-AP MLD 220 of FIG. 2 are illustrated in FIG. 3

In the example, an AP MLD 210 may have buffered traffic (or data) 303 to be transmitted to the non-AP MLD 220. Further, the non-AP MLD 220 may also have buffered traffic 313 to be transmitted to the AP MLD 210. The buffered traffic 303 and 313 may be a BU (bufferable unit) conforming to IEEE 802.11 standard.

The AP 1 affiliated with the AP MLD 210 transmits the buffered traffic 303 to the STA 1 affiliated with the non-AP MLD 220 via the Link 1 after performing backoff procedure 301 for access to the Link 1. Then, the AP 1 receives ACK 305 from the STA 1 via the Link 1. In parallel, the STA 2 affiliated with the non-AP MLD 220 transmits the buffered traffic 313 to the AP 2 affiliated with the AP MLD 210 via the Link 2 after performing backoff procedure 311 for access to the Link 2. Then, the STA 2 receives ACK 315 from the AP 2 via the Link 2. As shown, the downlink traffic 303 from the AP 1 to the STA 1 and the uplink traffic 313 from the STA 2 to the AP 2 may simultaneously be transmitted between the AP MLD 210 and the non-AP MLD 220 using multiple links (Link 1 and Link 2). Accordingly, the multi-link operation may improve responsiveness for the service based on bilateral traffic such as online game.

Figure 4:
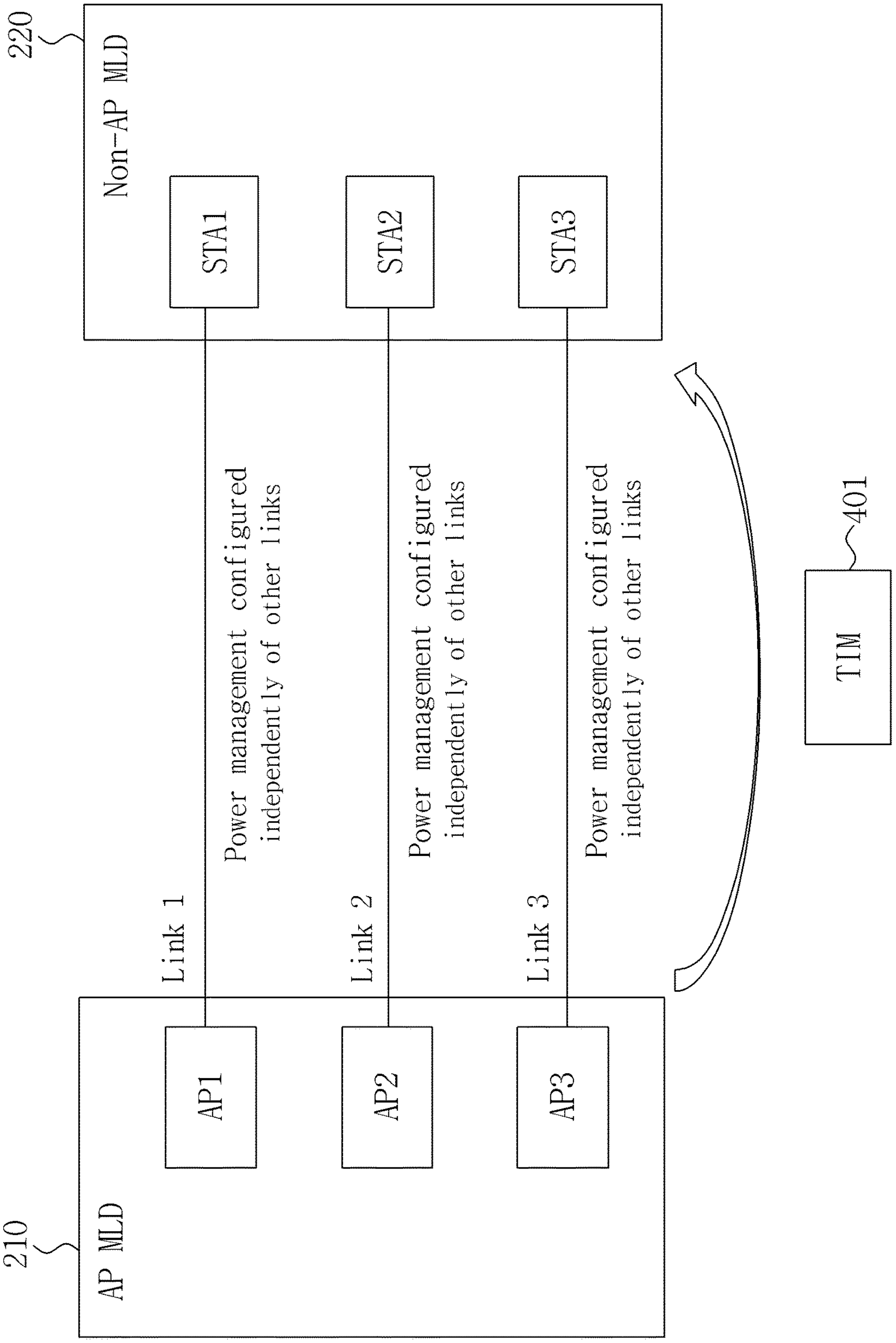
FIG. 4 shows an example of power management in multi-link operation in accordance with an embodiment.

FIG. 4 shows an example of power management in multi-link operation in accordance with an embodiment.

In FIG. 4, three links (Link 1, Link 2, and Link 3) between the AP MLD 210 and the non-AP MLD 220 are set up. Each affiliated STA of the non-AP MLD 220 may maintain its own power management mode (e.g., active mode and power save mode) and power state (e.g., awake state and doze state) on the corresponding link during the multi-link operation. In some implementations, each affiliated STA of the non-AP MLD 220 may independently indicate its power management mode in a power management subfield (i.e., PM bit) of Frame Control field of frames conforming IEEE 802.11 standard. Thus, each link may independently enter a power save mode and transition to a doze state after successful frame exchanges.

On the other hand, downlink data (or BU) may be buffered at AP MLD 210 level rather than each AP level of the AP MLD 210. Thus, a TIM (traffic indication map) element 401 included in a beacon frame may be also determined by the AP MLD 210 during the multi-link operation. The TIM element 401 may include information to signal availability of buffered data for any STAs of the non-AP MLD 220.

If at least one STA affiliated with the non-AP MLD 220 is in an active mode, the AP MLD 210 may not perform buffering downlink data to be transmitted. However, if all STAs affiliated with the non-AP MLD 220 is in the doze state, the AP MLD 210 may perform buffering downlink data and may commonly advertise (or broadcast) the TIM element 401 indicating pending buffered data via all or any of three links (Link 1, Link 2, and Link 3) to corresponding STA affiliated with the non-AP MLD 220. Based on the TIM element 401, any STA affiliated with the non-AP MLD 220 may retrieve the buffered data via the link on which the STA operates from a corresponding AP of the AP MLD 210.

In an embodiment, the multi-link operation may allow the AP MLD and the non-AP MLD to transmit frames belongs to specific TIDs (traffic identifiers) on specific link per direction (i.e., downlink, uplink, or both), which is described below referring to FIG. 5.

Figure 5:
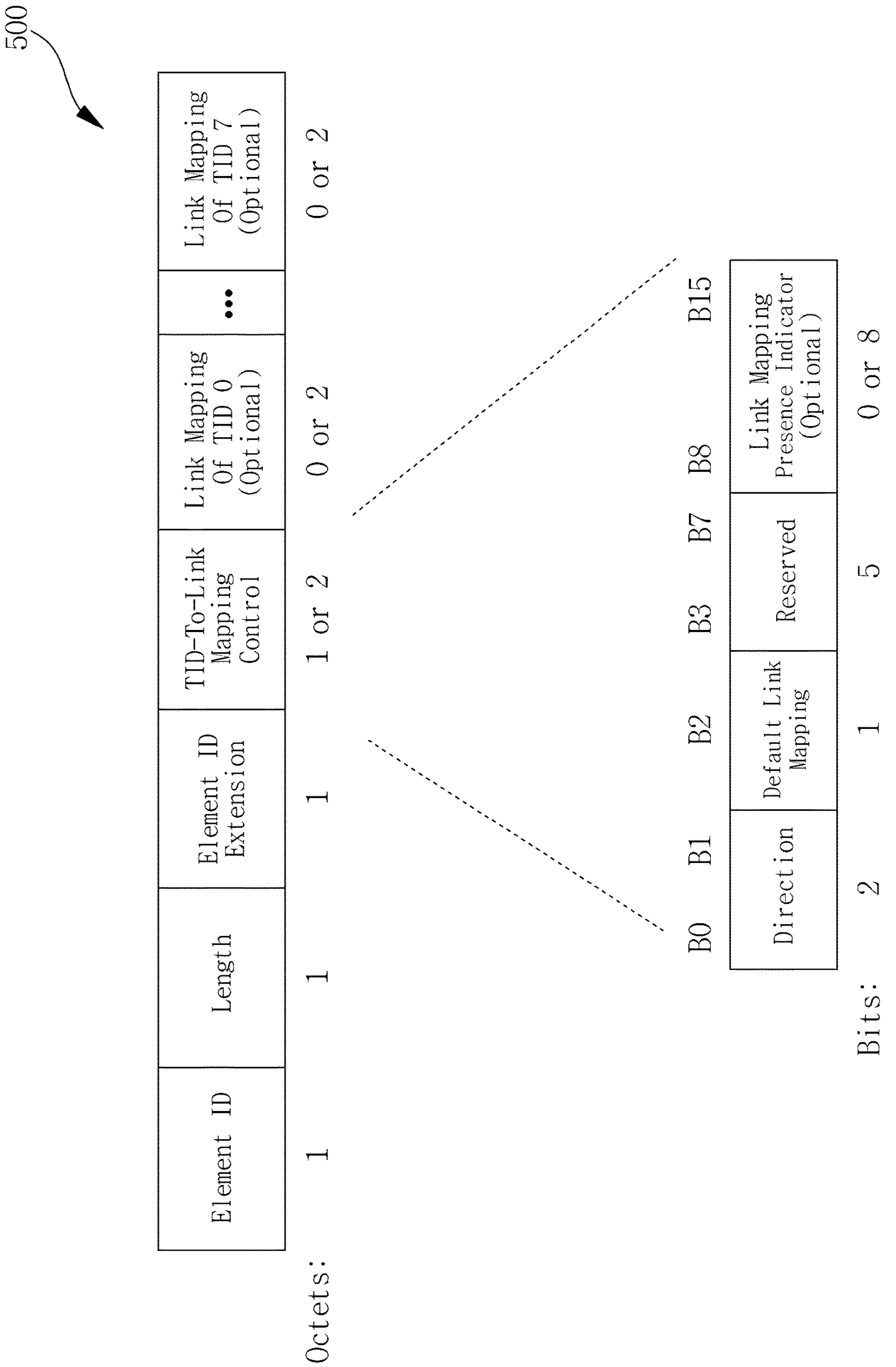
FIG. 5 shows an example of a TID-to-Link Mapping element in accordance with an embodiment.

FIG. 5 shows an example of a TID-to-Link Mapping element in accordance with an embodiment. This example of FIG. 5 may be usable in IEEE 802.11be standard and any of future amendments to IEEE 802.11 standard. The TID-to-Link Mapping element 500 may indicate the links on which frames belongings to each TID can be exchanged.

As shown in FIG. 5, the TID-to-Link Mapping element 500 includes an Element ID field, a Length field, an Element ID Extension field, a TID-to-Link Mapping Control field, and optional Link Mapping of TID n fields.

The Element ID field and the Element ID Extension field may include information to identify the TID-to-Link Mapping element 500. The Length field may indicate a length of the TID-to-Link Mapping element 500.

The TID-to-Link Mapping Control field includes a Direction subfield, a Default Link Mapping subfield, a Reserved subfield, and an optional Link Mapping Presence Indicator subfield. The Direction subfield may indicate if the TID-to-Link Mapping element 500 is for downlink frames, uplink frames, or both. For example, the Direction subfield may be set to 0 for downlink frames, 1 for uplink frames, and 2 for frames transmitted both on downlink and uplink. The Default Link Mapping subfield may indicate if the TID-to-Link Mapping element 500 represents default TID-to-link mapping. For example, the subfield may be set to 1 for default mapping and 0 for non-default mapping. The Link Mapping Presence Indicator subfield may indicate whether the Link Mapping Of TID n fields are present in the TID-To-Link Mapping element 500.

The Link Mapping of TID n fields may indicate the links on which frames belonging to the TID n are allowed to be sent. The Link Mapping of TID n fields may carry a bitmap of the links to which the TID n is mapped. When the Default Link Mapping subfield of the TID-To-Link Mapping Control field represents default TID-to-link mapping, the Link Mapping of TID n fields may not be present.

For example, when the Direction subfield is set to 0, the Default Link Mapping subfield is set to 0, and the Link Mapping of TID 0 field is configured to 10000 . . . 0, this configuration indicates that downlink data corresponding TID 0 is transmitted on Link 1.

The TID-to-Link Mapping element may be included in various management frames such as a beacon frame, an association request/response frame, a re-association request/response frame, and a probe response frame.

The AP MLD and the non-AP MLD may determine how downlink and uplink data corresponding to TID values will be assigned to the links. By default, all TIDs may be mapped to all links for both downlink and uplink. Otherwise, after negotiation between the AP MLD and the non-AP MLD, the Link Mapping of TID n fields may be set to indicate specific links on which frames belongs to the TID n are allowed to be sent. For non-default mapping mode, there may be TIDs which are not assigned for downlink or uplink on specific links, and thus are not usable. Accordingly, the AP MLD may transmit buffered data to the non-AP MLD via the links indicated by the Link Mapping of TID n fields in the non-default mapping mode. However, the AP MLD 210 may not suitably indicate the presence of pending buffered data for specific links to be retrieved from the non-AP MLD using the TID-to-Link Mapping element because the TID-to-Link Mapping element only indicates the links on which frames belongings to each TID can be exchanged.

Figure 6:
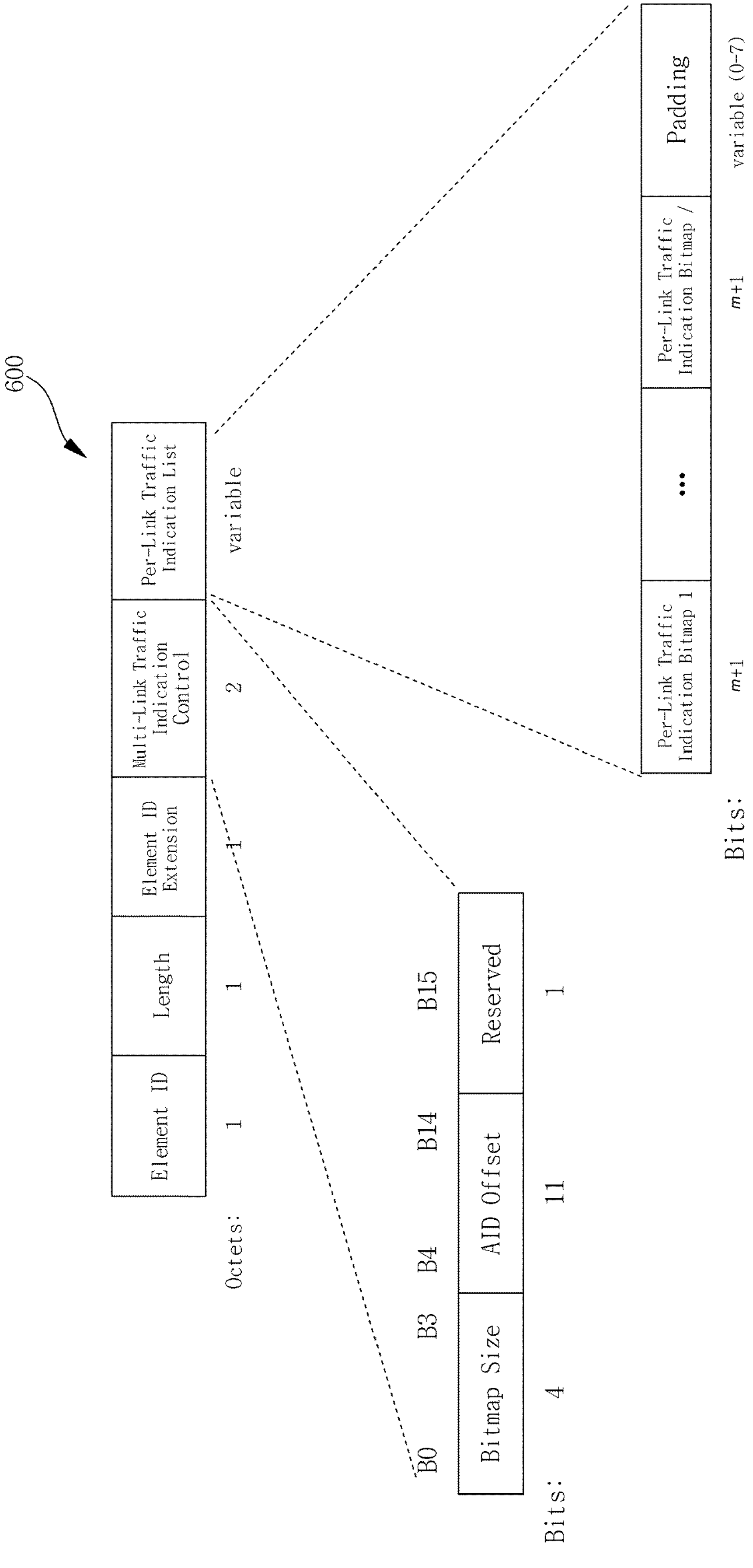
FIG. 6 shows an example of a Multi-Link Traffic Indication element in accordance with an embodiment.

FIG. 6 shows an example of a Multi-Link Traffic Indication element in accordance with an embodiment. This example may be usable in IEEE 802.11be standard and any of future amendments to IEEE 802.11 standard.

As shown in FIG. 6, the Multi-Link Traffic Indication element 600 may include an Element ID field, a Length field, an Element ID Extension ID field, a Multi-Link Traffic Indication Control field, and a Per-Link Traffic indication List field.

The Element ID field and the Element ID extension field may include information to identify the Multi-Link Traffic indication element 600. The Length field may indicate a length of the Multi-Link Traffic indication element 600.

The Multi-Link Traffic Indication Control field may include a Bitmap Size subfield, an AID (association identifier) Offset subfield, and Reserve subfield. The Bitmap Size subfield may indicate the size of each Per-Link Traffic Indication Bitmap subfield in the Per-Link Traffic Indication List field. The AID offset subfield may indicate a bit numbered k of a traffic indication virtual bitmap indicating the status of buffered, individually addressed data for a STA or a non-AP MLD whose AID is k.

The Per-Link Traffic Indication List field may include a plurality of Per-Link Traffic Indication Bitmap subfields and a Padding subfield. The Per-Link Traffic Indication Bitmap subfields may indicate per-link traffic indication for the non-AP MLD that has negotiated the TID-to-link mapping with the AP MLD and not all TIDs are mapped to all enabled links. In an embodiment, the Per-Link Traffic Indication Bitmap subfield may indicate recommended links on which pending buffered traffic is to be retrieved based on amount of buffered traffic or incoming traffic rate. The Padding subfield may include padding bits to make The Per-Link Traffic Indication List field a multiple of 8 bits.

An AP affiliated with the AP MLD 210 may include the Multi-Link Traffic Indication element 600 in a beacon frame along with a TIM element if the AP MLD 210 has successfully negotiated the TID-to-link mapping with the non-AP MLD 220 in a nondefault TID-to-link mapping mode. In an embodiment, the AP affiliated with the AP MLD may include the Multi-Link Traffic Indication element 600 indicating recommended links to which pending buffered traffic is mapped in a beacon frame along with a TIM element regardless of the TID-to-link mapping mode. The Multi-Link Traffic indication element 600 may be decodable together with the TIM element in the non-AP MLD which may detect recommended links on which the non-AP MLD retrieves the buffered traffic.

FIG. 7 shows an example of construction of the Multi-Link Traffic Indication element in accordance with an embodiment.

In FIG. 7, the Traffic indication virtual bitmap and the Partial Virtual Bitmap in TIM illustrated in the top and middle portions show how to indicate the AID of the receiving non-AP MLD. The AID Offset subfield indicates the bit number k of the Traffic indication virtual bitmap which corresponds to the AID of affiliated STAs of the non-AP MLD. The Multi-link Traffic Indication element illustrated in the bottom portion shows how to indicate recommended links for each STAs of the non-AP MLD. The order of the Per-Link Traffic Indication Bitmap subfields follows the order of the bits that are set to 1 in the Partial Virtual Bitmap subfield in the TIM element. Therefore, the Per-link Traffic Indication Bitmap 1 subfield indicates that the AP MLD has pending buffered traffic on a link with Link ID 1 for a non-AP MLD having AID corresponding AID offset k. The Per-link Traffic Indication Bitmap 2 subfield indicates that the AP MLD has pending buffered traffic on a link with Link ID 1 for a non-AP MLD having AID corresponding AID offset k+1. The Per-link Traffic Indication Bitmap 3 indicates that the AP MLD has pending buffered traffic on two links, the one with Link ID 1 and the other with Link ID 2, for a non-AP MLD having AID corresponding AID offset k+3. A non-AP MLD having AID offset k+2 is not included in the Per-link Traffic indication bitmap because the bit is set to 0 in the Partial Virtual Bitmap subfield in the TIM element. In this embodiment, the links indicated by the Per-link Traffic Indication Bitmap subfields may be the link(s) on which corresponding STA(s) operating are in a power save mode, particularly in a doze state.

As shown in FIG. 7, the Multi-Link Traffic Indication element may include AID information which has been assigned to non-AP MLDs in both a default mapping and a non-default mapping to represent the recommended links.

Figure 8:
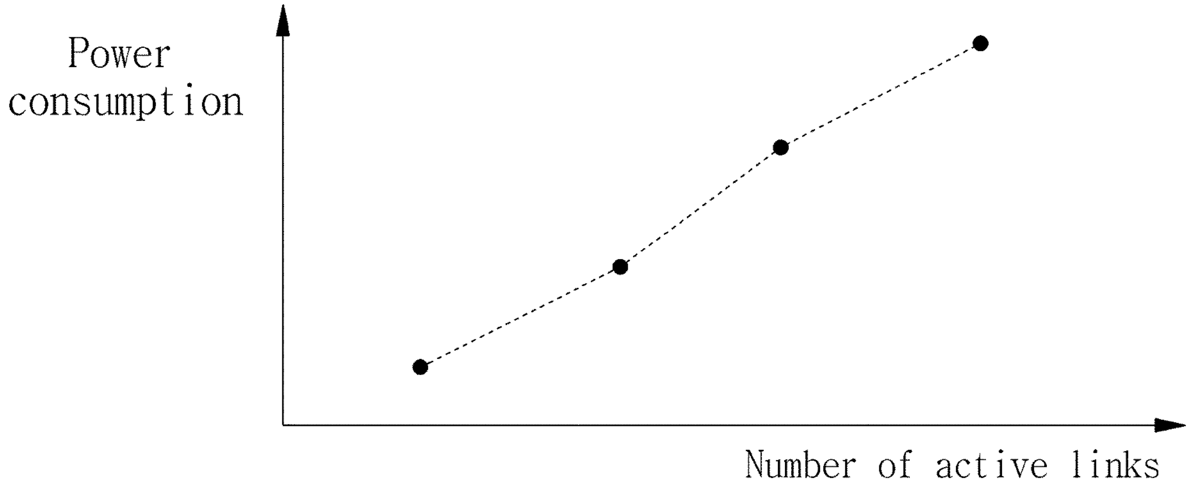
FIG. 8 shows an example of power consumption according to the number of links in an active mode in accordance with an embodiment.

FIG. 8 shows an example of power consumption according to the number of links in an active mode in accordance with an embodiment.

In FIG. 8, the number of links in active mode is illustrated along the horizontal dimension and the power consumption of the non-AP MLD is illustrated along the vertical dimension. The power consumption of the non-AP MLD increases in proportion to the number of links in the active mode. As the non-AP MLD contains separate radio processors (i.e., PHY and lower MAC) for each link, the more link the non-AP MLD uses, the more power consumption increases. It is very important to optimize power consumption for mobile devices such as a smartphone that is typically battery powered. For this reason, multi-link power management to optimize power consumption is required in multi-link operation of WLAN.

Figure 9:
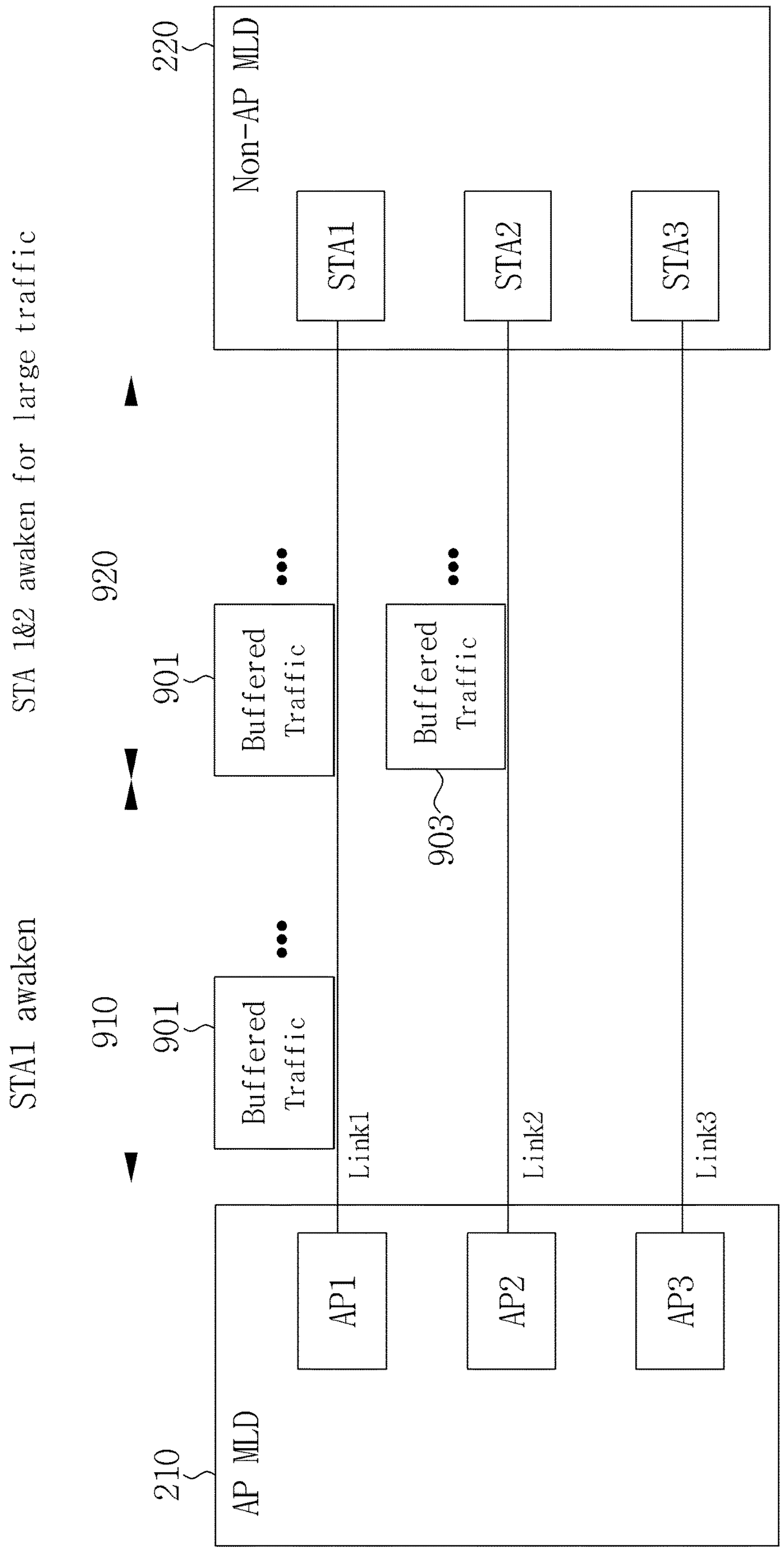
FIG. 9 shows an example of multi-link power management in accordance with an embodiment.

FIG. 9 shows an example of multi-link power management in accordance with an embodiment.

As shown in this example, in the initial time duration 910, only STA 1 affiliated with the non-AP MLD 220 is in an awake state and other STAs of the non-AP MLD 220 are in doze states. Thus, the STA 1 may detect existence of pending traffic 901 from a TIM information or/and a Multi-Link Traffic Indication element included in the beacon frame transmitted from the AP 1 of the AP MLD 210. Then, the STA 1 may retrieve the pending traffic 901 from the AP1 by issuing a trigger frame, for example, a PS (power save)-Poll frame or a U-APSD (unscheduled automatic power save delivery) trigger frame.

On the other hand, if the AP MLD 210 continuously transmits a considerable amount of buffered traffic, the non-AP MLD 220 may try to retrieve the buffered traffic by other STAs affiliated with the non-AP MLD 220 via other links (i.e., Link 2 or Link 3). As shown in the second line in FIG. 9, in time duration 920, the STA 2 affiliated with the non-AP MLD 220 may transition to an awake state and may fetch the buffered traffic 903 from the AP 2 by transmitting a PS-Poll or U-APSD trigger frame. Thus, in the time duration 920, both STA 1 and STA 2 are respectively retrieving buffered traffic from AP 1 and AP 2 via Link 1 and Link 2.

Conversely, while both STA 1 and STA 2 are retrieving buffered traffic via Link 1 and Link 2, the non-AP MLD 220 may transition either STA 1 or STA 2 to a doze state and may retrieve buffered traffic using only one STA via the corresponding link if the non-AP MLD 220 determine that the amount of receiving traffic is reduced enough for one STA of the non-AP MLD 220 to retrieve.

In this example of FIG. 9, the non-AP MLD 220 manages the number of links to retrieve the buffered traffic by monitoring the amount of receiving traffic from the AP MLD 210. It may not provide a prompt or timely response to traffic fluctuation in the AP MLD which results in causing transmission delay or unnecessary power consumption.

Figure 10:
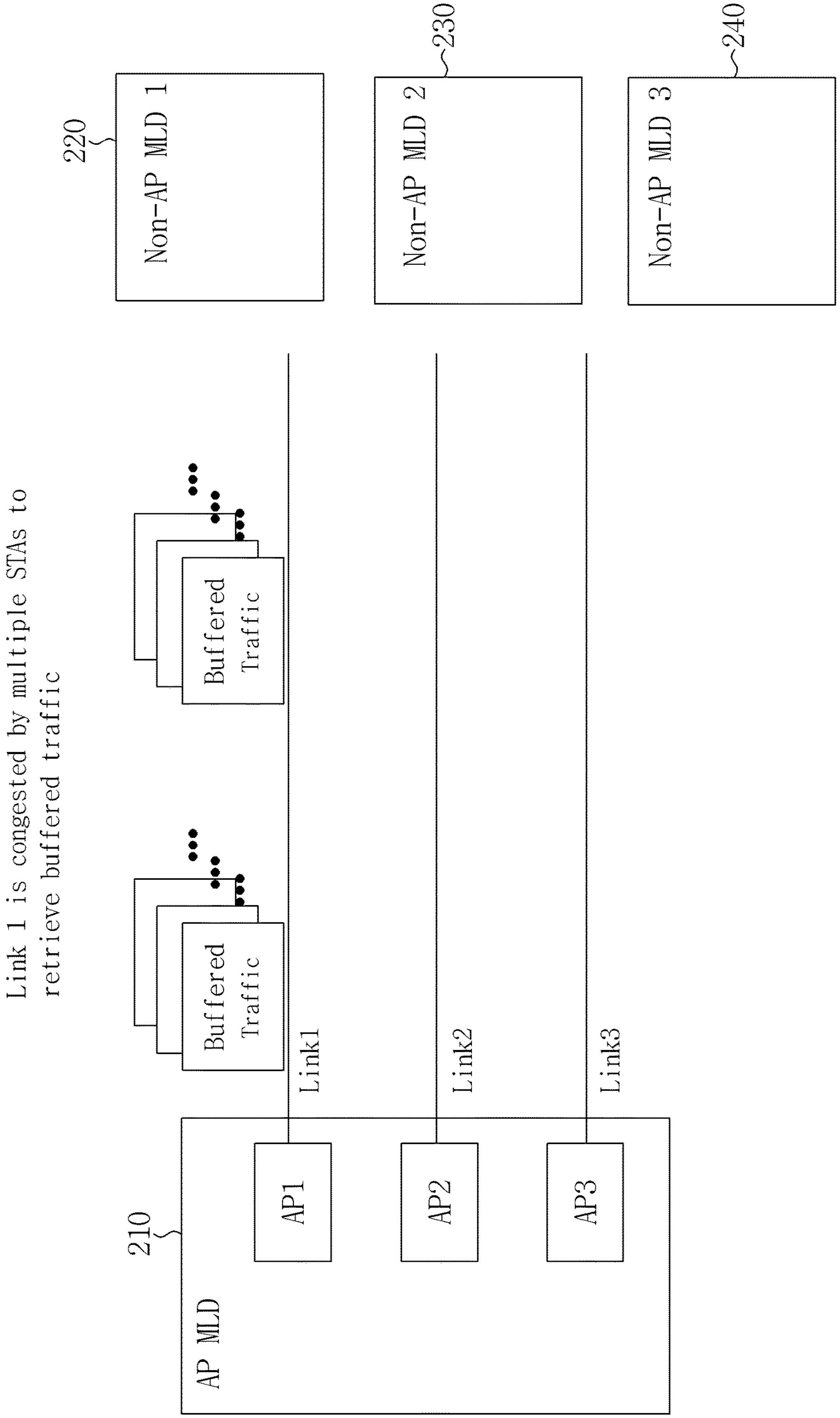
FIG. 10 shows another example of multi-link power management in accordance with an embodiment.

FIG. 10 shows another example of multi-link power management in accordance with an embodiment.

As shown in FIG. 10, a plurality of non-AP MLDs, such as a non-AP MLD 1 220, a non-AP MLD 2 230, and a non-AP MLD 3 240, are associated with the AP MLD 210. Each non-AP MLD 220, 230 and 240 may include a plurality of affiliated STAs and each STA may set up a link (Link 1, Link 2, or Link 3) with corresponding AP affiliated with the AP MLD 210.

Each STA affiliated with the non-AP MLDs 220, 230 and 240 may maintain power management on each link, including managing its power management mode (e.g., active mode and power save mode) and its power state (e.g., awake state and doze state). In the example of FIG. 10, when all non-AP MLDs 220, 230 and 240 are in a power save mode and the AP MLD 210 has buffered traffic to be transmitted to a plurality of non-AP MLDs, the plurality of non-AP MDLs may commonly try to retrieve buffered traffic via only Link 1 because the power management on the links is individually performed by each of the non-AP MLDs 220, 230 and 240. It may induce severe traffic congestion on Link 1 and high contention level between the non-AP MLDs which may result in a transmission delay and data rate decrease.

Each of non-AP MLDs 220, 230, and 240 may also determine that the amount of buffered traffic to retrieve is low enough for a single STA. Thus, each of non-AP MLDs 220, 230, and 240 may not allow other STAs to retrieve the buffer traffic via other links other than Link 1. It may cause a significant delay until each non-AP MLD 220, 230, and 240 transitions other STAs of the non-AP MLDs to an awake state to retrieve buffered traffic via other links.

Hereinafter, a mechanism that an AP MLD may provide a link recommendation for the non-AP MLD to retrieve buffered traffic based on amount of incoming traffic and data rata.

Figure 11A:
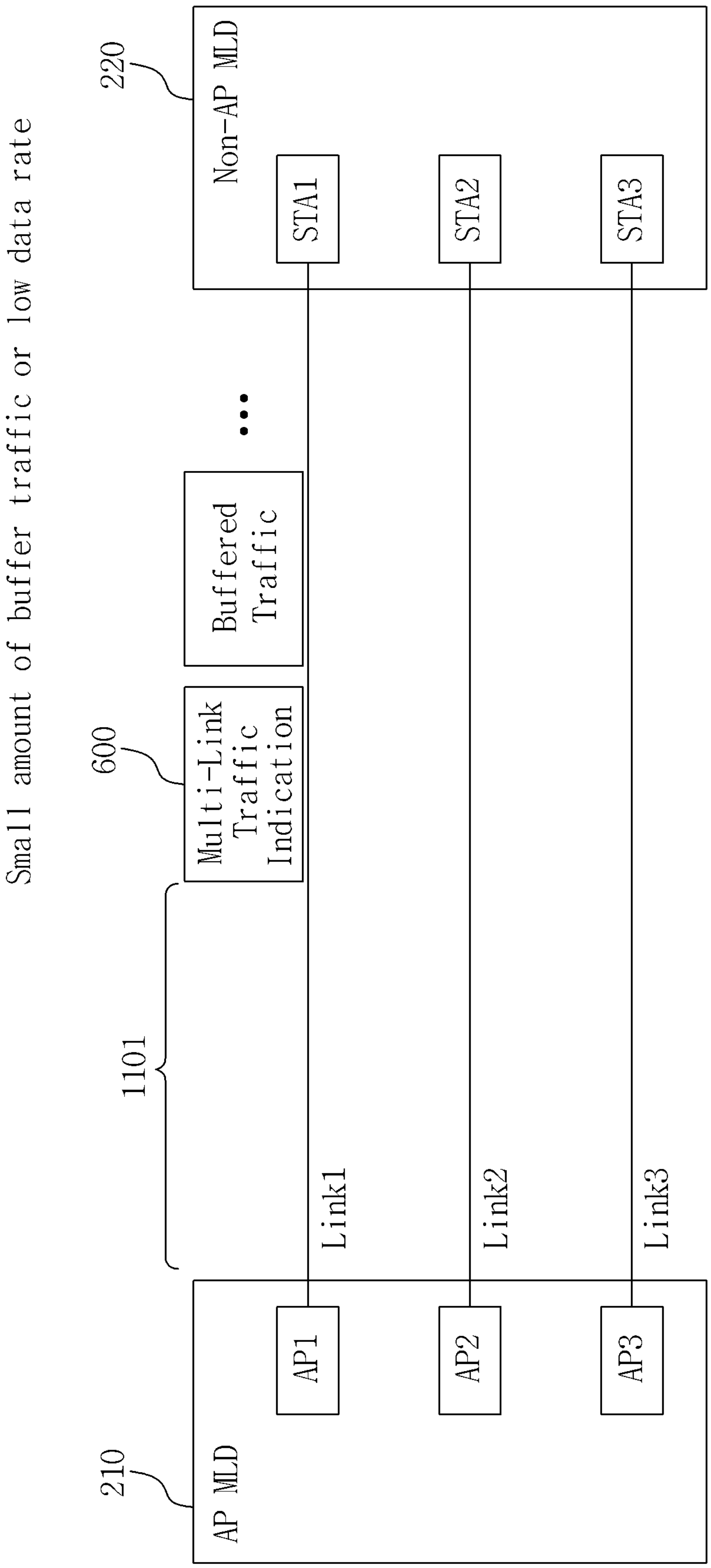
FIG. 11A and FIG. 11B show examples of multi-link power management using the Multi-Link Traffic Indication element in accordance with an embodiment.
Figure 11B:
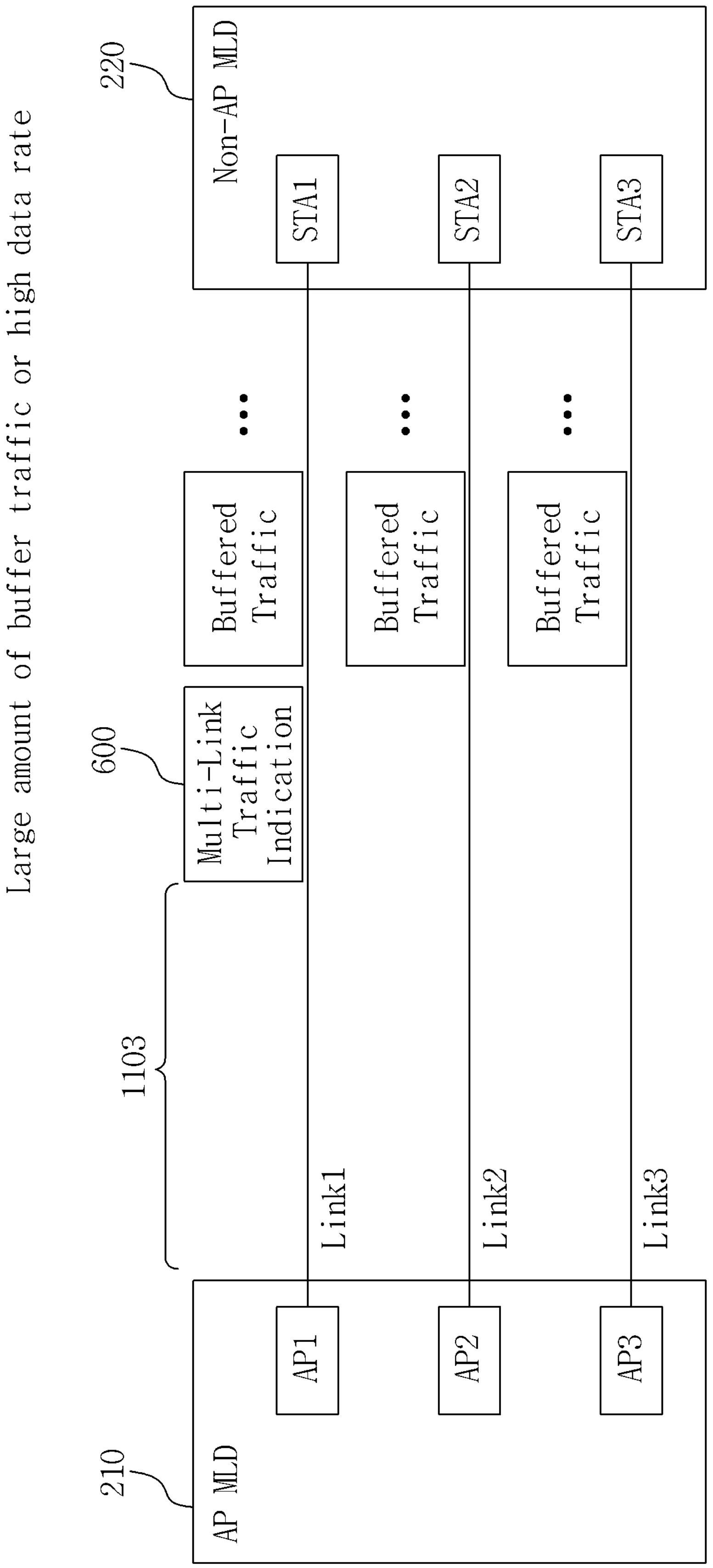

FIG. 11A and FIG. 11B show examples of multi-link power management using the Multi-Link Traffic Indication element in accordance with an embodiment.

In these examples, an AP affiliated with the AP MLD 210 may indicate presence of pending buffered traffic and link recommendation for STAs affiliated with non-AP MLD 220 using the Multi-Link Traffic indication element. As described above, the Multi-Link Traffic Indication element 600 may indicate link recommendations to retrieve buffered traffic based on an amount of buffered traffic or incoming traffic rate in the Per-Link Traffic Indication Bitmap subfields.

In FIG. 11A, all STAs affiliated with the non-AP MLD 220 are in a power save mode in the initial duration 1101 of the illustration. During the power save mode, the STA 1 of the non-AP MLD 220 may wake up to receive a beacon frame including the Multi-Link Traffic Indication element 600 which comprises a link recommendation for Link 1 to retrieve buffered traffic in the AP MLD 210. Thus, the non-AP MLD 220 may determine that the AP MLD 210 has downlink traffic that is recommended to be retrieved on the Link 1. Then, the STA 1 of the non-AP MLD 220 transitions to an awake state to retrieve the buffered traffic by sending a PS poll frame or a U-APSD trigger frame to the AP 1 of the AP MLD 210. Both STA 2 and STA 3 of non-AP MLD 220 may continue to stay in the power save mode. The AP MLD 210 may determine the number of links to retrieve the buffered traffic on based on an amount of traffic or incoming traffic rate. In this embodiment, the AP MLD 210 determines one link (Link 1) as a recommended link since it has a small amount of traffic or low incoming traffic rate.

In another embodiment, the AP 1 of the AP MLD 210 may transmit the Multi-Link Traffic Indication element 600 in a beacon frame which may include a link recommendation for more than one link. As shown in FIG. 11B, all STAs affiliated with the non-AP MLD 220 are in a power save mode in the initial duration 1103 of the illustration. During the power save mode, the STA 1 of the non-AP MLD 220 may wake up to receive a beacon frame including the Multi-Link Traffic Indication element 600 which comprises a link recommendation for Link 1, Link 2 and Link 3 to retrieve buffered traffic in the AP MLD 210. Thus, the non-AP MLD 220 may determine that the AP MLD 210 has downlink traffic that is recommended to be retrieved on Link 1, Link 2, and Link 3. Then, all of STA 1, STA 2, and STA 3 affiliated with the non-AP MLD 220 transitions to an awake state to retrieve downlink traffic by sending a PS poll frame or a U-APSD trigger frame to the AP 1, AP 2, and AP 3 of the AP MLD 210, respectively. Thus, all STAs of the non-AP MLD 220 may retrieve buffered traffic from the AP MLD 210. In this embodiment, the AP MLD 210 determines three links (Link 1, Link 2, and Link 3) as recommended links when it has a large amount of traffic or high incoming traffic rate.

As described herein, the AP MLD 210 may be able to control the number of links to be used in multi-link operation based on the amount of traffic or the incoming traffic rate to support a variety of delay-sensitive applications or real-time applications such as augmented reality (AR), robotics, artificial intelligence (AI), cloud computing, and unmanned vehicles.

Figure 12A:
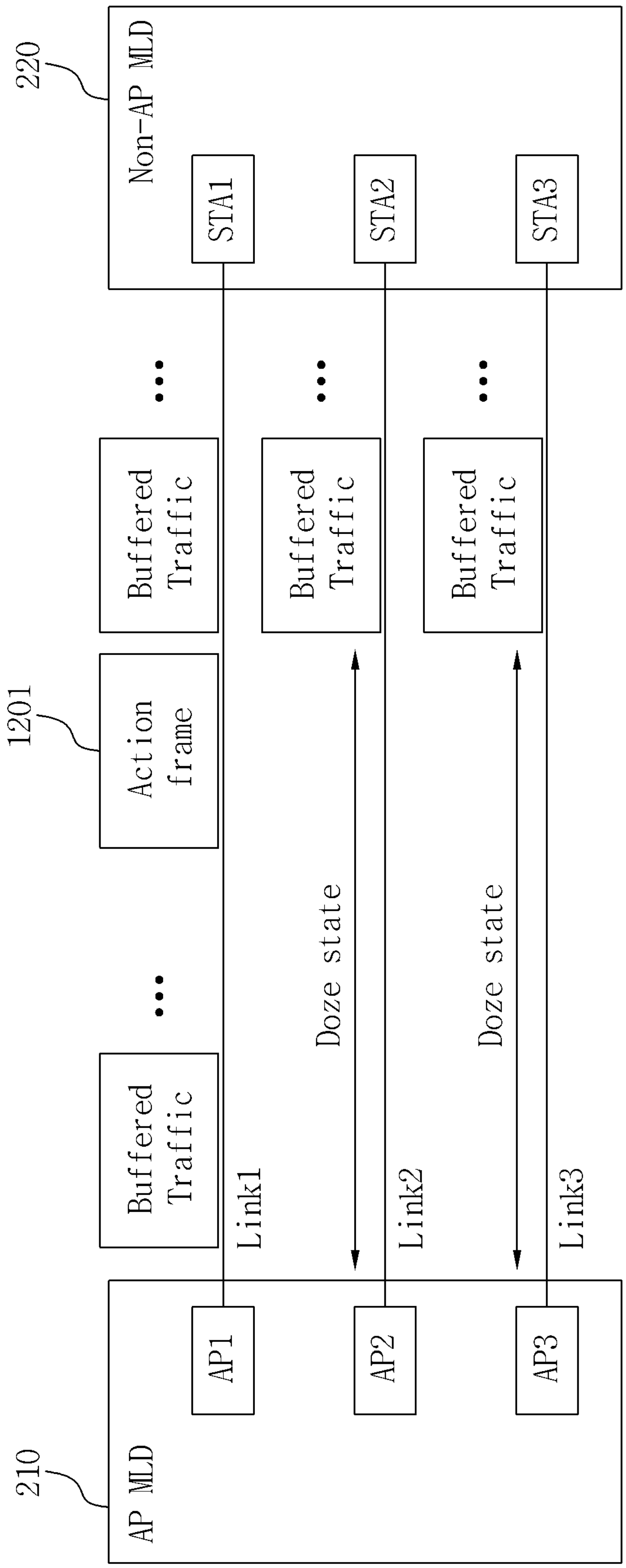
FIG. 12A and FIG. 12B show another examples of multi-link power management in accordance with an embodiment.
Figure 12B:
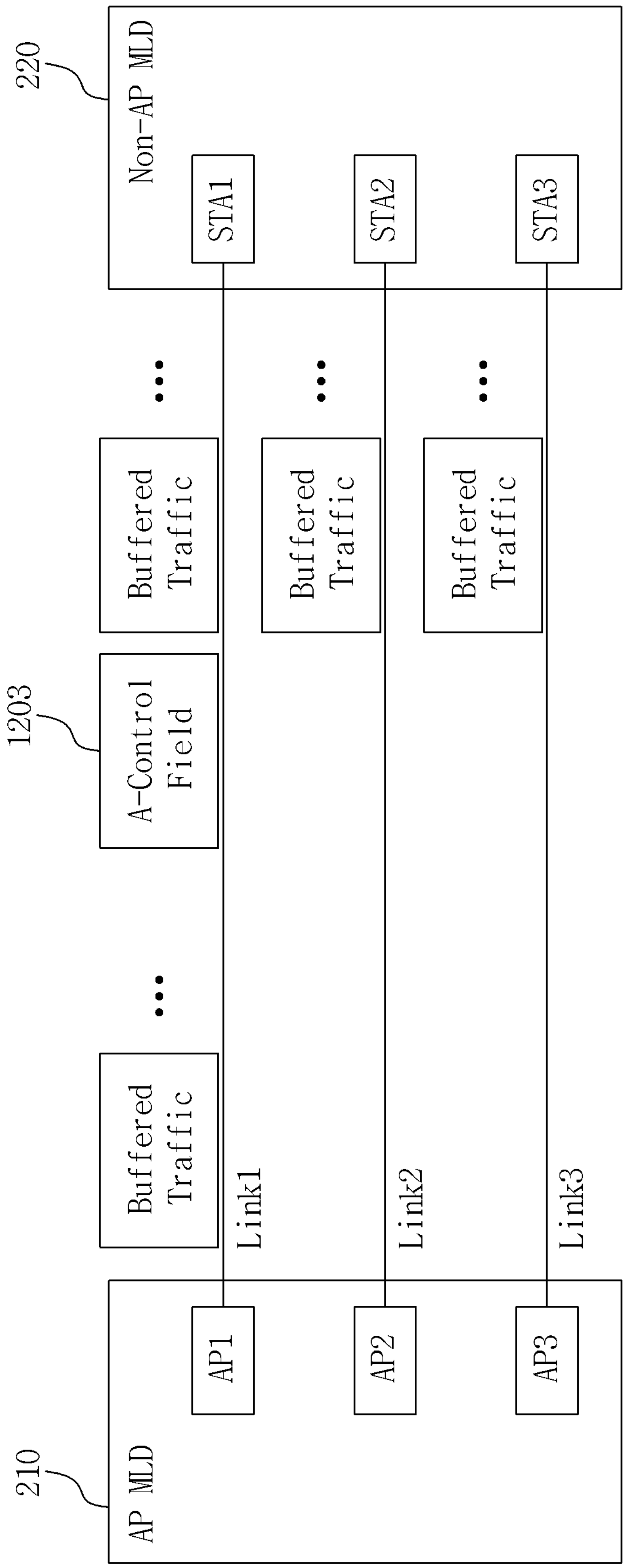

FIG. 12A and FIG. 12B show another examples of multi-link power management in accordance with an embodiment.

In these examples, an AP affiliated with the AP MLD 210 may indicate presence of pending buffered traffic and link recommendation for STAs of the non-AP MLD 220 using an action frame or control information. These examples of FIGS. 12A and 12B may be applicable when STAs are in an active mode while the examples of FIG. 11A and FIG. 11B may be applicable when STAs are in a power save mode.

In FIG. 12A, the AP 1 of the AP MLD 210 may transmit downlink traffic to the STA 1 of the non-AP MLD 220 by frame exchange in an active mode while the STA 2 and STA 3 of the non-AP MLD 220 are in a power save mode. While operating in the active mode, the AP 1 of the AP MLD 210 may transmit an indication of presence of pending buffered traffic and link recommendation for another STAs (i.e., STA 2, STA 3, or both) of the non-AP MLD 220 when the AP MLD 210 has a large amount of traffic or high incoming traffic rate. The indication may be included in a downlink fame such as action frame 1201. The action frame 1201 may be a new type of management frame used to trigger the non-AP MLD 220 to transition a power state of STAs affiliated with the non-AP MLD from a doze state to an awake state. The action frame 1201 including the indication may be newly defined in IEEE 802.11 standard or be one of existing action frames which additionally includes the indication.

In the example of FIG. 12A, the action frame 1201 may indicate presence of buffered traffic and recommended links (Link 1, Link 2, and Link 3). Then, the non-AP MLD 220 may determine that the AP MLD 210 has downlink traffic that is recommended to be retrieved on Link 1, Link 2, and Link 3. Then, the STA 2 and the STA 3 transitions to an awake state to retrieve downlink traffic by sending a PS poll frame or a U-APSD trigger frame to the AP 2 and the AP 3 of the AP MLD 210, respectively. Thus, all STAs of the non-AP MLD 220 may receive buffered traffic from the AP MLD 210.

While all STAs of the non-AP MLD 220 are operating in the awake state, any AP (e.g., AP 1) of the AP MLD 210 may transmit to corresponding STA (e.g., STA1) of the non-AP MLD 220 the action frame 1201 including an indication of updated recommended link(s) (for example, Link 1). Then, the non-AP MLD 220 may determine that only Link 1 is specified as a recommended link. Then, the STA 2 and the STA 3 of the non-AP MLD 220 respectively operating on Link 2 and Link 3 may enter a power save mode and transition to a doze state. Thus, only STA1 of the non-AP MLD 220 may receive buffered traffic from AP1 of the AP MLD 210 via Link 1. Accordingly, the AP MLD 210 may control the number of links used for transmitting downlink traffic based on the amount of traffic or incoming traffic rate using the action frame in an active mode.

In another embodiment, as shown in FIG. 12B, the indication of pending buffered traffic and link recommendation for STAs of the non-AP MLD 220 may be included in data or a field of a frame. For example, the indication may be included in a subfield of A(aggregated)-Control field 1203 in a MAC header. The A-Control field is a universal carrier of all control information needed for specific standard features and can be dynamically added to any PPDU (physical layer protocol data unit) with minimal overhead.

Figure 13:
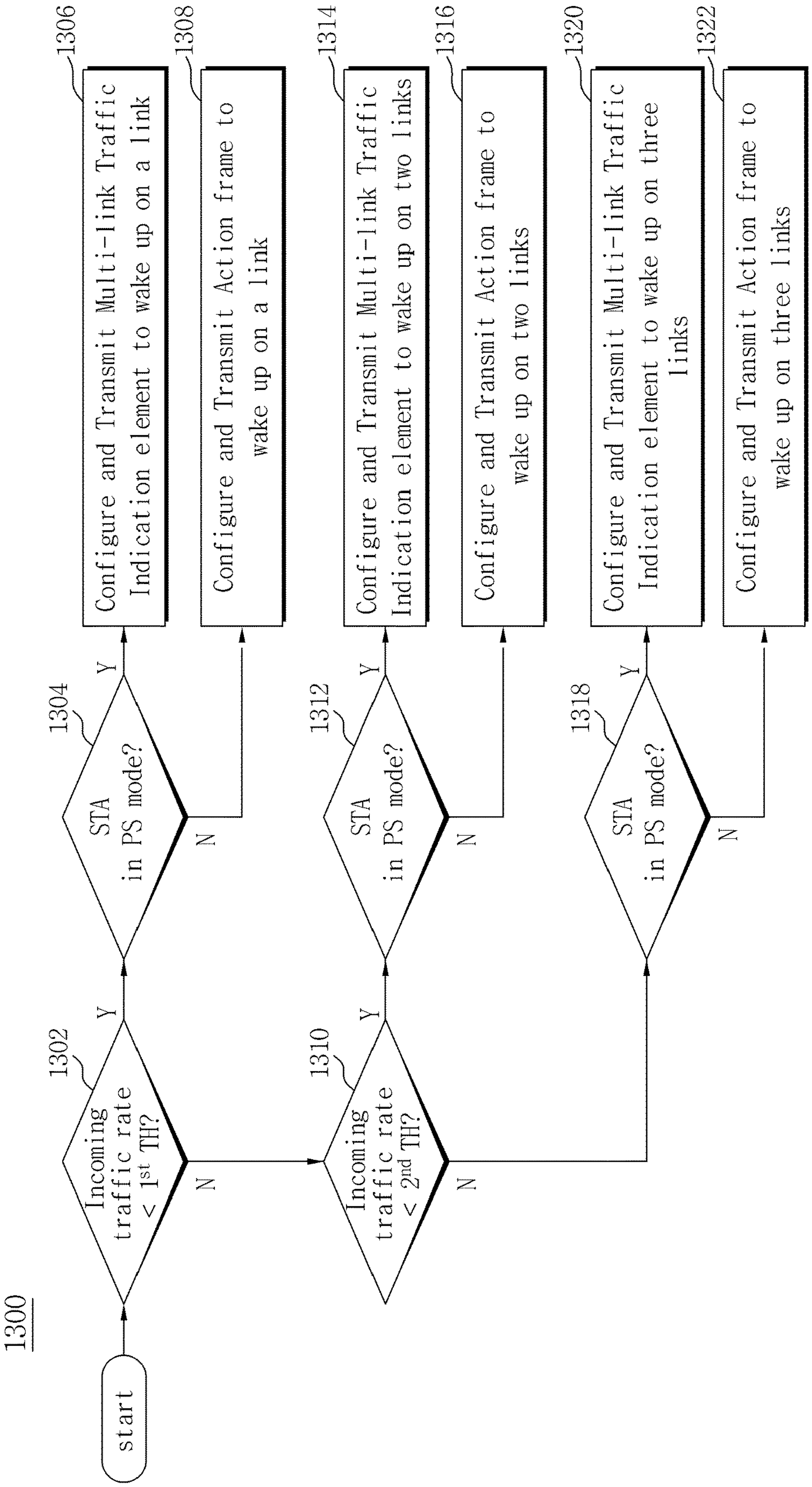
FIG. 13 shows an example of a process for facilitating multi-link operation by AP MLD in accordance with an embodiment.

FIG. 13 shows an example of a process 1300 for facilitating multi-link operation by AP MLD in accordance with an embodiment.

In operation 1302, the AP MLD determines whether incoming traffic rate is smaller than a first threshold (TH). The first threshold may be set by a designer or determined by a processor in the AP MLD. The process 1300 proceeds to operation 1304 when the incoming traffic rate is smaller than the first threshold, and otherwise proceeds to operation 1310.

In operation 1304, the AP MLD determines whether a receiving STA affiliated with the non-AP MLD is in a power save mode. The process 1300 proceeds to operation 1306 when the receiving STA is in the power save mode, and otherwise proceeds to operation 1308.

In operation 1306, the AP MLD configures and transmits a Multi-link Traffic Indication element in a beacon frame to the receiving STA affiliated with the non-AP MLD in the power save mode. The Multi-link Traffic Indication element includes indication of a recommended link to which the pending buffered traffic is mapped. The recommended link may or may not be the same as the link on which the Multi-link Traffic indication element is transmitted. Then, a STA of the non-AP MLD which has set up the recommended link retrieves the buffered traffic in an awake state.

In operation 1308, the AP MLD configures and transmits an action frame to the receiving STA affiliated with the non-AP MLD in an active mode. The action frame includes indication of a recommended link to which pending buffered traffic is mapped. The recommended link may or may not be the same as the link on which the action frame is transmitted. Then, a STA of the non-AP MLD which has set up the recommended link retrieves the buffered traffic in an awake state.

In operation 1310, the AP MLD determines whether the incoming traffic rate is smaller than a second threshold. The second threshold may be set by a designer or determined by a processor in the AP MLD. The process 1300 proceeds to operation 1312 when the incoming traffic rate is smaller than the second threshold, and otherwise proceeds to operation 1318.

In operation 1312, the AP MLD determines whether a receiving STA affiliated with the non-AP MLD is in a power save mode. The process 1300 proceeds to operation 1314 when the receiving STA is in the power save mode, and otherwise proceeds to operation 1316.

In operation 1314, the AP MLD configures and transmits a Multi-link Traffic Indication element in a beacon frame to the receiving STA affiliated with the non-AP MLD in the power save mode. The Multi-link Traffic Indication element includes indication of two recommended links to which pending buffered traffic is mapped. The recommended links may or may not include the link on which the Multi-link Traffic indication element is transmitted. Then, two STAs of the non-AP MLD which have set up the recommended links retrieve the buffered traffic in an awake state.

In operation 1316, the AP MLD configures and transmits an action frame to the receiving STA affiliated with the non-AP MLD in an active mode. The action frame includes indication of two recommended links to which pending buffered traffic is mapped. The recommended links may or may not include the link on which the action frame is transmitted. Then, two STAs of the non-AP MLD which have set up the recommended links retrieve the buffered traffic in an awake state.

In operation 1318, the AP MLD determines whether a receiving STA affiliated with the non-AP MLD is in a power save mode. The process 1300 proceeds to operation 1320 when the receiving STA is in the power save mode, and otherwise proceeds to operation 1322.

In operation 1320, the AP MLD configures and transmits a Multi-link Traffic Indication element in a beacon frame to the receiving STA affiliated with the non-AP MLD in the power save mode. The Multi-link Traffic Indication element includes indication of three recommended links to which pending buffered traffic is mapped. The recommended links may or may not include the link on which the Multi-link Traffic indication element is transmitted. Then, three STAs of the non-AP MLD which have set up the recommended links retrieve the buffered traffic in an awake state.

In operation 1322, the AP MLD configures and transmits an action frame to the receiving STA affiliated with the non-AP MLD in an active mode. The action frame includes indication of three recommended links to which pending buffered traffic is mapped. The recommended links may or may not include the link on which the action frame is transmitted. Then, three STAs of the non-AP MLD which have set up the recommended links retrieve the buffered traffic in an awake state.

In FIG. 13, the incoming traffic rate to determine how many links would be used may be replaced with other parameters, such as an amount of incoming traffic, according to various embodiments without departing from the scope of this disclosure. Additionally, even though the example of FIG. 13 assumes that maximum three links are available in the multi-link operation, the total number of available links may be larger than the three in other embodiments.

Figure 14:
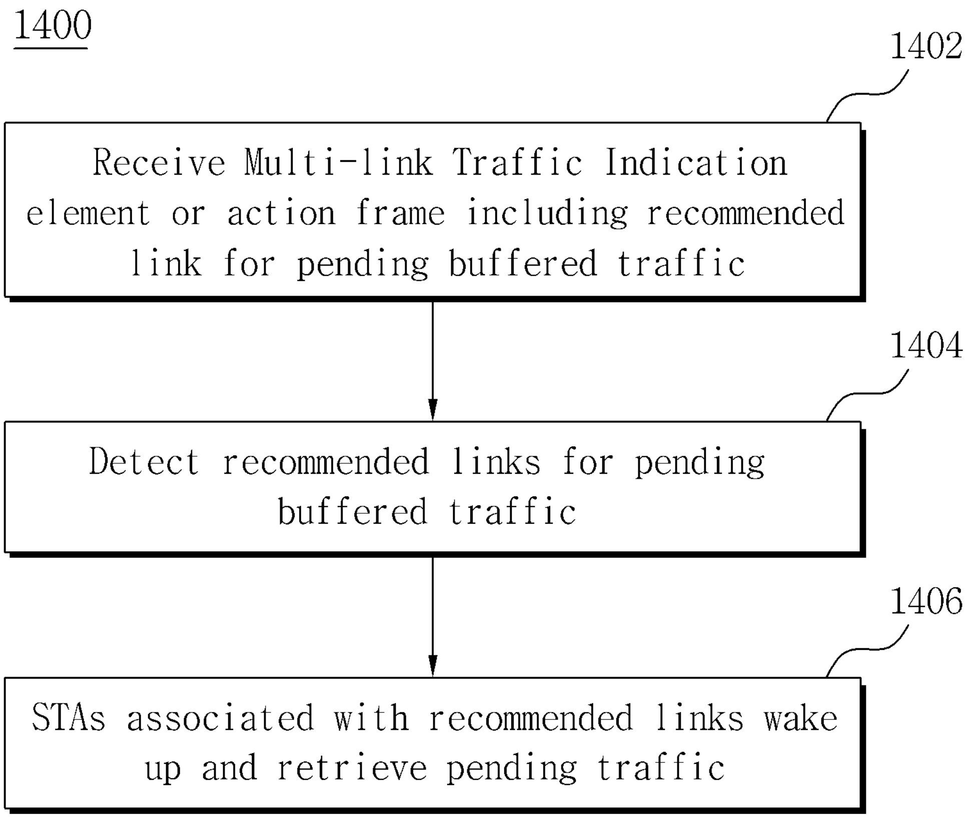
FIG. 14 shows an example of a process for facilitating multi-link operation by non-AP MLD in accordance with an embodiment.

FIG. 14 shows an example of a process for facilitating multi-link operation by non-AP MLD in accordance with an embodiment.

In operation 1402, the non-AP MLD receives a Multi-link Traffic Indication element or an action frame from an AP affiliated with the AP MLD. The Multi-link Traffic Indication element and action frame includes indication of one or more recommended links on which pending buffered traffic is to be retrieved. The recommended link(s) may or may not include the link on which the Multi-link Traffic indication element or the action frame is transmitted.

In operation 1404, the non-AP MLD detects the recommended link(s) to retrieve the pending buffered traffic from the AP MLD, based on the Multi-link Traffic Indication element or the action frame.

In operation 1406, the non-AP MLD wakes up the STAs associated with the recommended links and sends PS poll frame or a U-APSD trigger frame to the corresponding APs of the AP MLD to retrieve the pending traffic.

Figure 15:
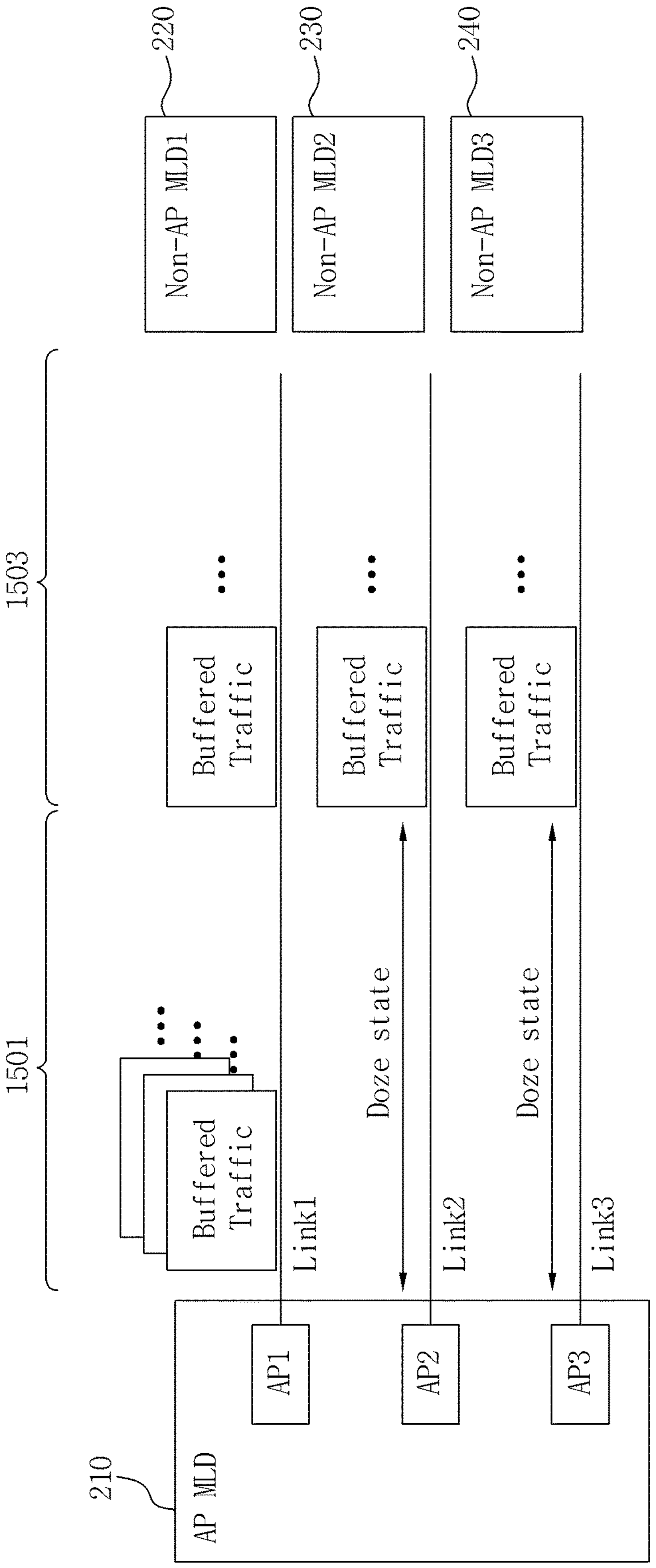
FIG. 15 shows an example of load balancing in multi-link operation in accordance with an embodiment.

FIG. 15 shows an example of load balancing in multi-link operation in accordance with an embodiment.

As shown in FIG. 15, a plurality of non-AP MLDs, such as three non-AP MLDs 220, 230 and 240, are associated with the AP MLD 210. Each non-AP MLD 220, 230 and 240 may include a plurality of affiliated STAs and each STA may set up a link (Link 1, Link 2, or Link 3) with a corresponding AP affiliated with the AP MLD 210.

In the initial time duration 1501 of FIG. 15, the Link 1 is commonly used by all of non-AP MLDs in an active mode while other links (Link 2 and Link 3) are in a power save mode. The AP MLD 210 transmits indication of recommended links on which other STAs of the non-AP MLDs 230 and 240 retrieve downlink traffic on. The indication may be included in an action frame for receiving STAs in an active mode or be included in the Multi-link Traffic Indication element for receiving STAs in power save mode.

The non-AP MLDs 230 and 240 may determine that the Link 2 and Link 3 are specified as recommended links for the other STAs of the non-AP MLDs 230 and 240 and transition the STAs to an awake state to retrieve the buffered traffic by sending a PS-Poll or U-APSD trigger frame on the recommended links. In the time duration 1503, all links (Link 1, the Link 2, and the Link 3) are used by all non-AP MLDs. Thus, a large amount of traffic in the AP MLD 210 may be transmitted in a more balanced way over all three links.

Figure 16:
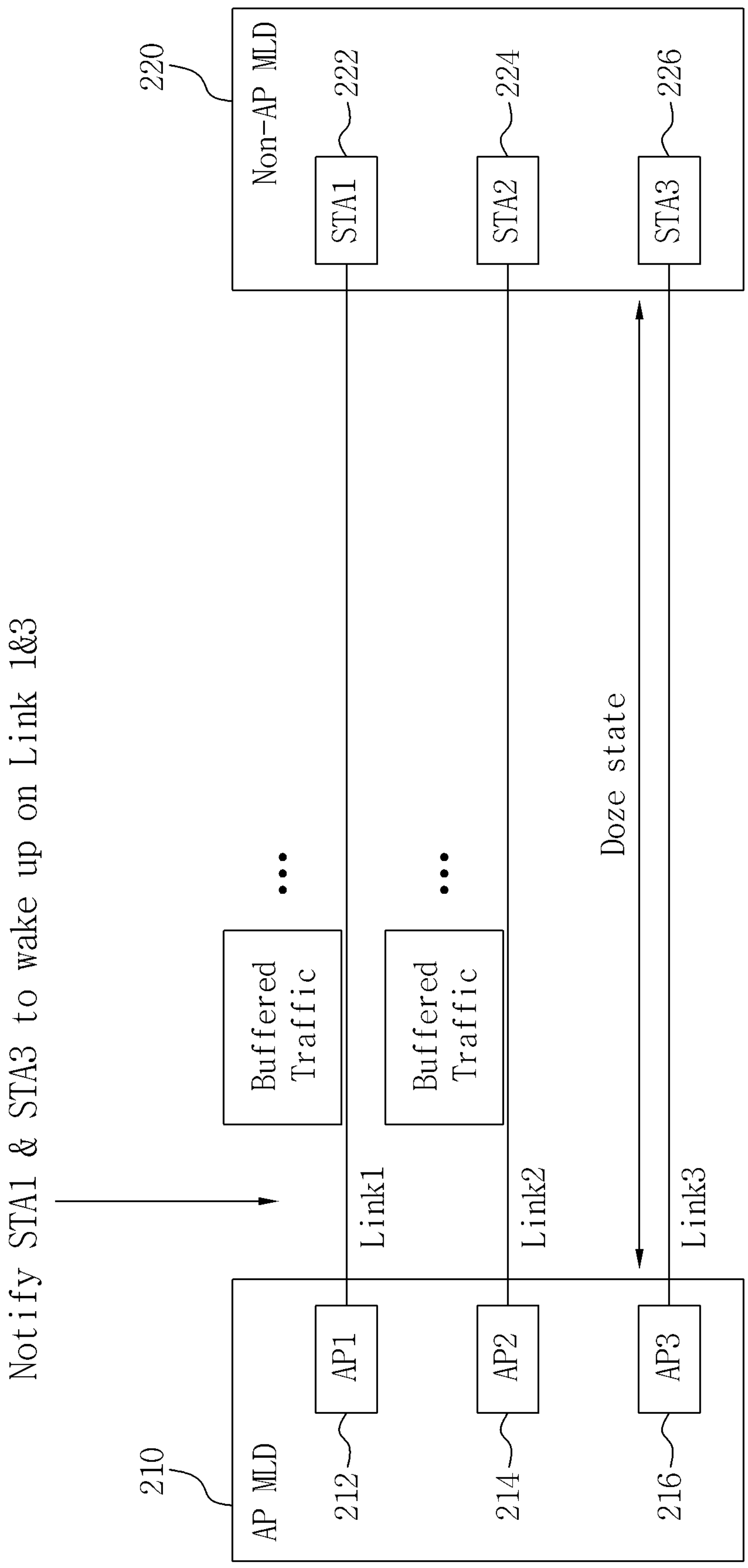
FIG. 16 shows another example of multi-link power management in accordance with an embodiment.

FIG. 16 shows another example of multi-link power management in accordance with an embodiment.

As shown in FIG. 16, the AP MLD 210 transmits indication of Link 1 and Link 3 as recommended links for STA 1 and STA 3 of the non-AP MLD 220 to wake up to retrieve buffered traffic. The indication may be included in the Multi-link Traffic Indication element for receiving STAs in power save mode or be included in an action frame for receiving STAs in active mode.

When the non-AP MLD 220 determines that the Link 1 and the Link 3 are available, the STA 1 and the STA 3 of the non-AP MLD 220 may wake up to retrieve the buffered traffic as recommended by the AP MLD 210. However, when the non-AP MLD 220 determines that the Link 1 and the Link 2 are available but the Link 3 is not available, the non-AP MLD 220 may wake up STA1 and STA 2 (instead of STA 3) that operate respectively on the Link 1 and the Link 2. The non-AP MLD 220 may determine that the Link 3 is not available for various reasons, for example, unstable link condition caused by concurrent services (e.g., soft AP, P2P). According to this embodiment, the non-AP MLD 220 may wake up on a different link than the recommended link based on an availability of the links of the non-AP MLD while keeping the number of links the same as the recommended one.

Figure 17:
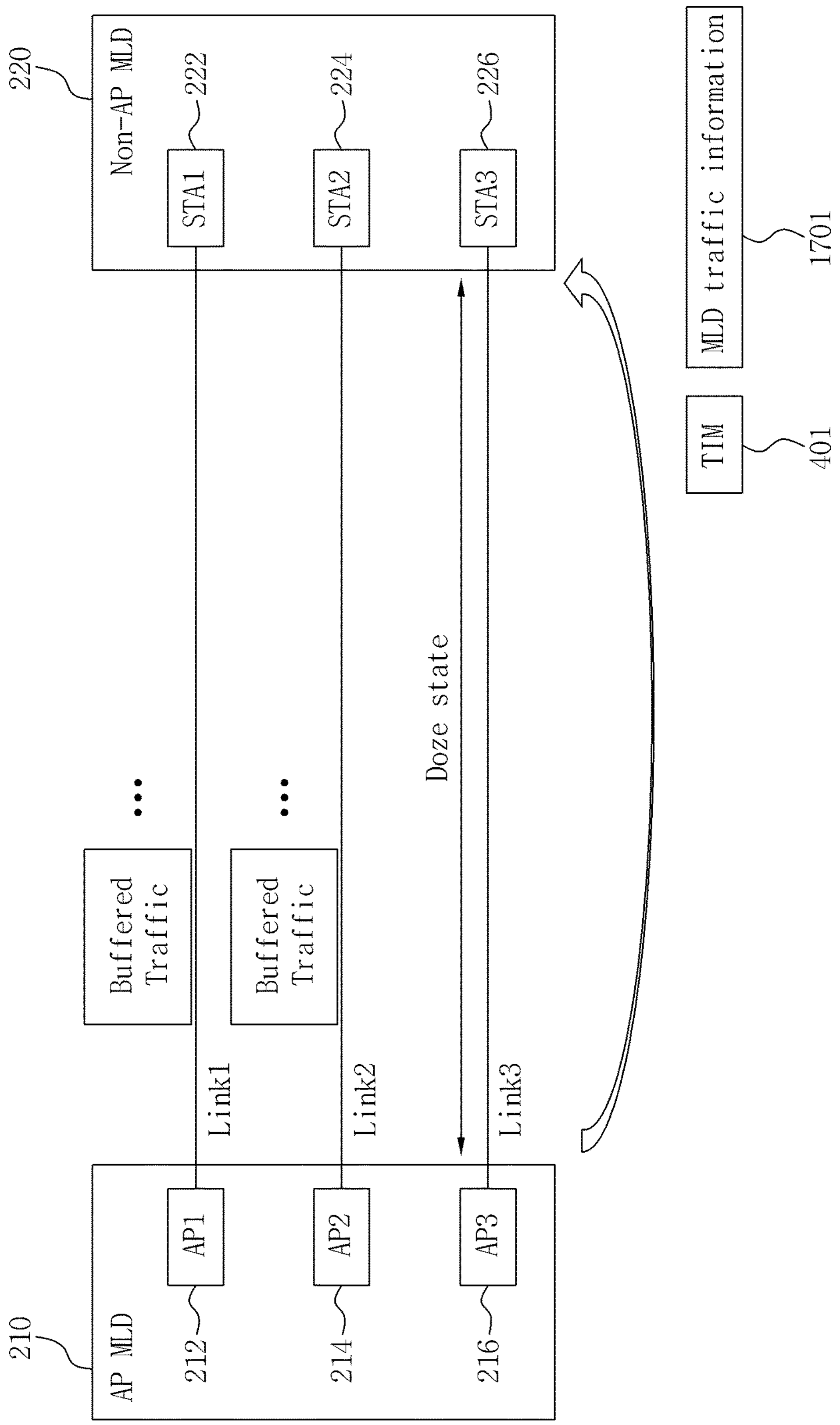
FIG. 17 shows another example of multi-link power management in accordance with an embodiment.

FIG. 17 shows another example of multi-link power management in accordance with an embodiment.

In this example, the AP MLD 210 periodically transmit or broadcast a beacon frame to the non-AP MLD 220. The beacon frame may include a TIM element 401 and an MLD (multi-link device) traffic information element 1701. The TIM element 401 includes timing and availability of data for associated STAs according to IEEE 802.11 standard. The MLD traffic information element 1701 may include information associated with buffer status such as incoming traffic rate or an amount of buffered traffic in the AP MLD 210. The MLD traffic information element 1701 may be a new type of element included in a beacon frame. It may be newly defined in IEEE 802.11 standard or be one of existing elements which additionally includes the buffer status information of the AP MLD 210.

The non-AP MLD 220 receives the beacon frame including the TIM element 401 and the MLD traffic information element 1701. Then, the non-AP MLD 220 detects the traffic status in the AP MLD 210 and determines one or more links to retrieve downlink traffic in the AP MLD 210 based on the MLD traffic information element 1701. The non-AP MLD 220 may wake up STAs operating on the one or more links which are in a doze state and retrieve buffered traffic. In this embodiment, the AP MLD may transmit or broadcast a buffer state information on the AP MLD instead of directly notifying the recommended links.

In another embodiment, the non-AP MLD 220 may transition a STA of the non-AP MLD 220 from an active mode to a power save mode when it determines that the AP MLD 210 has a small amount of traffic or low incoming traffic rate on based on the MLD traffic information element.

FIG. 18 shows an example of an electronic device in a network environment in accordance with an embodiment.

As shown in FIG. 18, the electronic device 1801 in the network environment 1800 may communicate with an electronic device 1802 via a first network 1898 (e.g., a short-range wireless communication network), or an electronic device 1804 or a server 1808 via a second network 1899 (e.g., a long-range wireless communication network). The electronic devices 1801, 1802, 1804 and server 1808 may be, for example, an AP MLD 210 or non-AP MLD 220. The first network 1898 or the second network 1899 may be, for example, a wireless local area network (WLAN) conforming IEEE 802.11be standard or any future amendments to IEEE 802.11 standard.

According to an embodiment, the electronic device 1801 may communicate with the electronic device 1804 via the server 1808. According to an embodiment, the electronic device 1801 may include a processor 1820, memory 1830, an input module 1850, a sound output module 1855, a display module 1860, an audio module 1870, a sensor module 1876, an interface 1877, a connecting terminal 1878, a haptic module 1879, a camera module 1880, a power management module 1888, a battery 1889, a communication module 1890, a subscriber identification module (SIM) 1896, or an antenna module 1897. In some embodiments, at least one of the components (e.g., the connecting terminal 1878) may be omitted from the electronic device 1801, or one or more other components may be added in the electronic device 1801. In some embodiments, some of the components (e.g., the sensor module 1876, the camera module 180, or the antenna module 1897) may be implemented as a single component (e.g., the display module 1860).

The processor 1820 may execute, for example, software (e.g., a program 1840) to control at least one other component (e.g., a hardware or software component) of the electronic device 1801 coupled with the processor 1820 and may perform various data processing or computation. According to one embodiment, as at least part of the data processing or computation, the processor 1820 may store a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor), or an auxiliary processor 1823 (e.g., a graphics processing unit (GPU), a neural processing unit (NPU), an image signal processor (ISP), a sensor hub processor, or a communication processor (CP)) that is operable independently from, or in conjunction with, the main processor 1821. For example, when the electronic device 1801 includes the main processor 1821 and the auxiliary processor 1823, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display module 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an ISP or a CP) may be implemented as part of another component (e.g., the camera module 1880 or the communication module 1890) functionally related to the auxiliary processor 1823. According to an embodiment, the auxiliary processor 1823 (e.g., the NPU) may include a hardware structure specified for artificial intelligence model processing. An artificial intelligence model may be generated by machine learning. Such learning may be performed, e.g., by the electronic device 1801 where the artificial intelligence is performed or via a separate server (e.g., the server 1808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input module 1850 may receive a command or data to be used by another component (e.g., the processor 1820) of the electronic device 1801, from the outside (e.g., a user) of the electronic device 1801. The input module 1850 may include, for example, a microphone, a mouse, a keyboard, a key (e.g., a button), or a digital pen (e.g., a stylus pen).

The sound output module 1855 may output sound signals to the outside of the electronic device 1801. The sound output module 1855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1860 may visually provide information to the outside (e.g., a user) of the electronic device 1801. The display module 1860 may include, for example, a display, a hologram device, or a projector and control circuitry to control a corresponding one of the display, hologram device, and projector. According to an embodiment, the display module 1860 may include a touch sensor adapted to detect a touch, or a pressure sensor adapted to measure the intensity of force incurred by the touch.

The audio module 1870 may convert a sound into an electrical signal and vice versa. According to an embodiment, the audio module 1870 may obtain the sound via the input module 1850 or output the sound via the sound output module 1855 or a headphone of an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high-definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, an HDMI connector, a USB connector, an SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, ISPs, or flashes.

The power management module 1888 may manage power supplied to the electronic device 1801. According to one embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more CPs that are operable independently from the processor 1820 (e.g., the application processor) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™ Wi-Fi direct, or IR data association (IrDA)) or the second network 1899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the SIM 1896.

The wireless communication module 1892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1892 may support a high-frequency band (e.g., the mmWave band) to achieve, e.g., a high data transmission rate. The wireless communication module 1892 may support various technologies for securing performance on a high-frequency band, such as, e.g., beamforming, massive multiple-input and multiple-output (MIMO), full dimensional MIMO (FD-MIMO), array antenna, analog beam-forming, or large-scale antenna. The wireless communication module 1892 may support various requirements specified in the electronic device 1801, an external electronic device (e.g., the electronic device 1804), or a network system (e.g., the second network 1899). According to an embodiment, the wireless communication module 1892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1897 may transmit or receive a signal or power to or from the outside (e.g., the external electronic device) of the electronic device 1801. According to an embodiment, the antenna module 1897 may include an antenna including a radiating element composed of a conductive material or a conductive pattern formed in or on a substrate (e.g., a printed circuit board (PCB)). According to an embodiment, the antenna module 1897 may include a plurality of antennas (e.g., array antennas). In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

According to various embodiments, the antenna module 1897 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 or 1804 may be a device of a same type as, or a different type, from the electronic device 1801. According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, mobile edge computing (MEC), or client-server computing technology may be used, for example. The electronic device 1801 may provide ultra low-latency services using, e.g., distributed computing or MEC. In another embodiment, the external electronic device 1804 may include an Internet-of-things (IoT) device. The server 1808 may be an intelligent server using machine learning and/or a neural network. According to an embodiment, the external electronic device 1804 or the server 1808 may be included in the second network 1899. The electronic device 1801 may be applied to intelligent services (e.g., smart home, smart city, smart car, or healthcare) based on 5G communication technology or IoT-related technology.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

One embodiment of the present disclosure provides an access point (AP) multi-link device (MLD) 210 (or electronic device 1801). The AP MLD comprises one or more memories 1830 and one or more processors 1820 operatively coupled to the one or more memories. The one or more processors are configured to cause transmitting, to a first station affiliated with a non-AP MLD 220 via a first link, an indication indicating presence of pending traffic on a second link. The one or more processors are configured to cause receiving, from a second station affiliated with the non-AP MLD via the second link, a trigger frame to retrieve buffered traffic from the AP MLD. The one or more processors are configured to cause transmitting, to the second station affiliated with the non-AP MLD via the second link, buffered traffic in response to receiving the trigger frame.

In some embodiments, when the indication indicating presence of pending traffic on the second link is transmitted, the first station and the second station affiliated with the non-AP MLD are in a power save mode.

In some embodiments, the indication indicating presence of pending traffic on the second link is included in a beacon frame.

In some embodiments, when the indication indicating presence of pending traffic on the second link is transmitted, the first station affiliated with the non-AP MLD is in an active mode and the second station affiliated with the non-AP MLD is in a power save mode.

In some embodiments, the indication indicating presence of pending traffic on the second link is included in an action frame or in A(aggregated)-Control field of a MAC (media access control) header.

In some embodiments, the trigger frame is a PS (power save)-Poll frame or a U-APSD (unscheduled automatic power save delivery) trigger frame.

In some embodiments, the one or more processors are further configured to cause generating the indication indicating presence of pending traffic on the second link based on an amount of traffic or incoming traffic rate in the AP MLD.

In some embodiments, wherein the indication further indicates presence of pending traffic on a third link.

In some embodiments, the one or more processors are further configured to cause receiving, from a third station affiliated with the non-AP MLD via the third link, a trigger frame to retrieve buffered traffic from the AP MLD, and transmitting, to the third station affiliated with the non-AP MLD via the third link, buffered traffic in response to receiving the trigger frame.

In some embodiments, when the indication indicating presence of pending traffic on the third link is transmitted, the third station affiliated with the non-AP MLD is in a power save mode.

One embodiment of the present disclosure provides a non-AP MLD 220 (or electronic device 1801). The non-AP MLD comprises one or more memories 1830 and one or more processors 1820 operatively coupled to the one or more memories. The one or more processors are configured to cause receiving, from a first AP affiliated with an AP MLD 210 via a first link, an indication indicating presence of pending traffic on a second link. The one or more processors are configured to cause transmitting, to a second AP affiliated with the AP MLD via the second link, a trigger frame to retrieve buffered traffic from the AP MLD. The one or more processors are configured to cause receiving, from the second AP affiliated with the AP MLD via the second link, buffered traffic from the AP MLD.

In some embodiments, when the indication indicating presence of pending traffic on the second link is received, the first station and the second station affiliated with the non-AP MLD are in a power save mode.

In some embodiments, the indication indicating presence of pending traffic on the second link is included in a beacon frame.

In some embodiments, when the indication indicating presence of pending traffic on the second link is received, the first station affiliated with the non-AP MLD is in an active mode and the second station affiliated with the non-AP MLD is in a power save mode.

In some embodiments, the indication indicating presence of pending traffic on the second link is included in an action frame or in A-Control field of a MAC header.

In some embodiments, the indication further indicates presence of pending traffic on a third link.

In some embodiments, the one or more processors are further configured to cause transmitting, to a third AP affiliated with the AP MLD via the third link, a trigger frame to retrieve buffered traffic from the AP MLD, and receiving, from the third AP affiliated with the AP MLD via the third link, buffered traffic from the AP MLD.

One embodiment of the present disclosure may provide a non-AP MLD 220 (or electronic device 1801). The non-AP MLD comprises one or more memories 1830 and one or more processors 1820 operatively coupled to the one or more memories. The one or more processors are configured to cause receiving, from a first AP affiliated with an AP MLD 210 via a first link, an indication of traffic status of the AP MLD. The one or more processors are configured to cause determining a second link as a link to retrieve buffered traffic from the AP MLD. The one or more processors are configured to cause transmitting, to a second AP affiliated with the AP MLD via the second link, a trigger frame to retrieve buffered traffic from the AP MLD. The one or more processors are configured to cause receiving, from the second AP affiliated with the AP MLD via the second link, buffered traffic from the AP MLD.

In some embodiments, the indication of traffic status of the AP MLD indicates a recommend link on which the non-AP MLD retrieves the buffered traffic.

In some embodiments, the recommended link is same as the second link.

In some embodiments, the recommended link is not same as the second link.

In some embodiments, when the indication of traffic status of the AP MLD is transmitted, the first station and the second station affiliated with the non-AP MLD are in a power save mode, and the indication of traffic status of the AP MLD is included in a beacon frame.

In some embodiments, the first station affiliated with the non-AP MLD is in an active mode and the second station affiliated with the non-AP MLD is in a power save mode when the indication of traffic status of the AP MLD is transmitted, and the indication of traffic status of the AP MLD is included in an action frame or in A-Control field of a MAC header.

What is claimed is:

1. An access point (AP) multi-link device (MLD), comprising:

one or more processors comprising processing circuitry; and memory storing instructions that, when executed by the one or more processors individually and/or in any combination, cause the AP MLD to:

transmit, to a non-AP MLD via a first link, an indication indicating presence of pending traffic on a second link and at least one recommended link on which the non-AP MLD retrieves the pending traffic on the second link;

receive, from the non-AP MLD via the at least one recommended link, a trigger frame to retrieve buffered traffic from the AP MLD; and transmit, to non-AP MLD via the at least one recommended link, buffered traffic in response to receiving the trigger frame, and wherein the AP MLD determines the at least one recommended link based on amount of traffic or incoming traffic rate in the AP MLD.

2. The AP MLD of claim 1, wherein when the indication is transmitted, a first station affiliated with the non-AP MLD corresponding to the first link and a second station affiliated with the non-AP MLD corresponding to the second link are in a power save mode.

3. The AP MLD of claim 2, wherein the indication is included in a beacon frame.

4. The AP MLD of claim 1, wherein when the indication is transmitted, a first station affiliated with the non-AP MLD corresponding to the first link is in an active mode and a second station affiliated with the non-AP MLD corresponding to the second link is in a power save mode.

5. The AP MLD of claim 4, wherein the indication is included in an action frame or in A (aggregated)-Control field of a MAC (media access control) header.

6. The AP MLD of claim 1, wherein the trigger frame is a PS (power save)-Poll frame or a U-APSD (unscheduled automatic power save delivery) trigger frame, and the instructions that, when executed by the one or more processors individually and/or in any combination, cause the AP MLD to:

generate the indication indicating presence of pending traffic on the second link based on an amount of traffic or incoming traffic rate in the AP MLD.

7. The AP MLD of claim 1, wherein the indication further indicates presence of pending traffic on a third link, wherein the at least one recommended link includes at least one link on which the non-AP MLD retrieves the pending traffic on the third link.

8. The AP MLD of claim 7, wherein when the indication indicating presence of pending traffic on the third link is transmitted, a third station affiliated with the non-AP MLD corresponding to the third link is in a power save mode.

9. A non-access point (AP) multi-link device (MLD), comprising:

one or more processors comprising processing circuitry; and memory storing instructions that, when executed by the one or more processors individually and/or in any combination, cause the non-AP MLD to:

receive, from an AP MLD via a first link, an indication indicating presence of pending traffic on a second link and at least one recommended link on which the non-AP MLD retrieves pending traffic on the second link;

transmit, to the AP MLD via the at least one recommended link, a trigger frame to retrieve buffered traffic from the AP MLD; and receive, from the AP MLD via the at least one recommended link, buffered traffic from the AP MLD, wherein the at least one recommended link is determined based on amount of traffic or incoming traffic rate in the AP MLD.

10. The non-AP MLD of claim 9, wherein when the indication is received, a first station affiliated with the non-AP MLD corresponding to the first link and a second station affiliated with the non-AP MLD corresponding to the second link are in a power save mode.

11. The non-AP MLD of claim 10, wherein the indication is included in a beacon frame.

12. The non-AP MLD of claim 9, wherein when the indication is received, a first station affiliated with the non-AP MLD corresponding to the first link is in an active mode and a second station affiliated with the non-AP MLD corresponding to the second link is in a power save mode.

13. The non-AP MLD of claim 12, wherein the indication is included in an action frame or in A-Control field of a MAC header.

14. The non-AP MLD of claim 9, wherein the indication further indicates presence of pending traffic on a third link, and wherein the at least one recommended link includes at least one link on which the non-AP MLD retrieves the pending traffic on the third link.

15. A non-access point (AP) multi-link device (MLD), comprising:

one or more memories; and one or more processors comprising processing circuitry operatively coupled to the one or more memories, the one or more processors configured, individually and/or in any combination, to cause:

receiving, from a first AP affiliated with an AP MLD via a first link, an indication of traffic status of the AP MLD indicating at least recommended link on which the non-AP MLD retrieves buffered traffic;

determining a second link among the at least recommended link as a link for retrieving buffered traffic from the AP MLD;

transmitting, to a second AP affiliated with the AP MLD via the second link, a trigger frame to retrieve buffered traffic from the AP MLD; and receiving, from the second AP affiliated with the AP MLD via the second link, buffered traffic from the AP MLD, and wherein the at least one recommended link is determined based on amount of traffic or incoming traffic rate in the AP MLD.

16. The non-AP MLD of claim 15, wherein when the indication of traffic status of the AP MLD is transmitted, a first station affiliated with the non-AP MLD corresponding to the first link and a second station affiliated with the non-AP MLD corresponding to the second link are in a power save mode and the indication of traffic status of the AP MLD is included in a beacon frame.

17. The non-AP MLD of claim 15, wherein when the indication of traffic status of the AP MLD is transmitted, a first station affiliated with the non-AP MLD corresponding to the first link is in an active mode and a second station affiliated with the non-AP MLD corresponding to the second link is in a power save mode, and the indication of traffic status of the AP MLD is included in an action frame or in A-Control field of a MAC header.

* * * * *